US011105662B2

(12) United States Patent
Connor et al.

(10) Patent No.: US 11,105,662 B2
(45) Date of Patent: Aug. 31, 2021

(54) CONTINUOUS UNMANNED AIRBORNE AND UNDERWATER MONITORING PLATFORM

(71) Applicant: ThayerMahan, Inc., Groton, CT (US)

(72) Inventors: Michael Joseph Connor, Mystic, CT (US); Richard Jude Hine, Elkton, VA (US)

(73) Assignee: ThayerMahan, Inc., Groton, CT (US)

( * ) Notice: Subject to any disclaimer, the term of this patent is extended or adjusted under 35 U.S.C. 154(b) by 416 days.

(21) Appl. No.: 16/179,701

(22) Filed: Nov. 2, 2018

(65) Prior Publication Data
US 2019/0128711 A1 May 2, 2019

Related U.S. Application Data

(60) Provisional application No. 62/580,831, filed on Nov. 2, 2017.

(51) Int. Cl.
*G01D 21/02* (2006.01)
*B63G 8/00* (2006.01)
(Continued)

(52) U.S. Cl.
CPC ............. *G01D 21/02* (2013.01); *B63G 8/001* (2013.01); *B64C 39/024* (2013.01); *H04W 4/38* (2018.02);
(Continued)

(58) Field of Classification Search
CPC ......... G01D 21/02; G01S 15/88; H04W 4/38; H04W 4/40; B63G 8/001;
(Continued)

(56) References Cited

U.S. PATENT DOCUMENTS 3,987,745 A 10/1976 Chaverebiere et al.
4,486,861 A 12/1984 Harmel
(Continued)

FOREIGN PATENT DOCUMENTS

WO WO-9950619 A1 10/1999

OTHER PUBLICATIONS

Homeland Security. Written Testimony of U.S. Coast Guard Commandant Admiral Robert Papp Jr. for a House Committee on Homeland Security, Subcommittee on Border and Maritime Security hearing titled "Future of the Homeland Security Missions of the Coast Guard". Available at https://www.dhs.gov/news/2014/02/04/written-testimony-uscg-commandant-admiral-robert-papp-jr-house-homeland-security. Released Feb. 4, 2014 (10 pgs.).
(Continued)

*Primary Examiner* — Stephen P Avila
(74) *Attorney, Agent, or Firm* — Wilson Sonsini Goodrich & Rosati

(57) ABSTRACT

Provided herein is a continuously unmanned multi-phenomenon sensor system and a continuously unmanned multi-phenomenon sensor platform comprising a plurality of continuously unmanned multi-phenomenon sensor systems for maritime monitoring, that is capable of surveying and monitoring rivers, ports, bays, coastal regions, and the high seas to conduct search operations, monitor for dangerous cargoes, prevent drug and migrant smuggling, enforce fisheries laws, monitor environmental conditions and living marine resources, inspect marine infrastructures, provide navigational aids, and to investigate marine accidents.

30 Claims, 13 Drawing Sheets

(51) Int. Cl.
*B64C 39/02* (2006.01)
*H04W 4/38* (2018.01)
*H04W 4/40* (2018.01)
*G01S 15/88* (2006.01)

(52) U.S. Cl.
CPC ......... *H04W 4/40* (2018.02); *B63G 2008/004* (2013.01); *B63G 2008/008* (2013.01); *B64C 2201/12* (2013.01); *B64C 2201/141* (2013.01); *G01S 15/88* (2013.01)

(58) Field of Classification Search
CPC ........ B63G 2008/004; B63G 2008/008; B64C 39/024; B64C 2201/12; B64C 2201/141
See application file for complete search history.

(56) References Cited

U.S. PATENT DOCUMENTS

| | | | |
|---|---|---|---|
| 4,912,682 | A | 3/1990 | Norton, Jr. et al. |
| 6,140,958 | A | 10/2000 | Johnson et al. |
| 6,208,584 | B1 | 3/2001 | Skinner |
| 6,590,831 | B1 | 7/2003 | Bennett et al. |
| 6,913,854 | B1 | 7/2005 | Alberte et al. |
| 7,775,174 | B1 | 8/2010 | Humphreys et al. |
| 9,778,388 | B1 | 10/2017 | Connor |
| 2003/0208320 | A1 | 11/2003 | Zajac |
| 2004/0030449 | A1* | 2/2004 | Solomon ............ H04B 7/18517 700/245 |
| 2004/0030571 | A1* | 2/2004 | Solomon ................. F41H 13/00 700/248 |
| 2009/0020063 | A1 | 1/2009 | Ruffa |
| 2009/0224099 | A1 | 9/2009 | Steele et al. |
| 2011/0055557 | A1 | 3/2011 | Nakamura |
| 2012/0042855 | A1 | 2/2012 | Vogely et al. |
| 2012/0134671 | A1 | 5/2012 | Edwards et al. |
| 2012/0186507 | A1 | 7/2012 | Nock |
| 2012/0227504 | A1 | 9/2012 | Goldner et al. |
| 2013/0247536 | A1 | 9/2013 | Erlendsson et al. |
| 2013/0266380 | A1 | 10/2013 | Capron et al. |
| 2015/0346365 | A1 | 12/2015 | Desrues |
| 2016/0139245 | A1 | 5/2016 | Forero et al. |
| 2016/0244135 | A1* | 8/2016 | Farber ................... B63G 8/001 |
| 2016/0264223 | A1* | 9/2016 | Ferguson ............... B63G 8/001 |
| 2018/0074174 | A1* | 3/2018 | Beer ....................... G01S 7/411 |

OTHER PUBLICATIONS

Wikipedia. Synthetic aperture sonar. Available at https://en.wikipedia.org/wiki/Synthetic_aperture_sonar (2 pgs.) (Last edited on Jul. 2, 2017).

Wikipedia. United States Coast Guard. Available at https://en.wikipedia.org/wiki/United_States_Coast_Guard (17 pgs.) (Last edited on Nov. 6, 2017).

Co-pending U.S. Appl. No. 17/145,094, inventors Hine; Richard J et al., filed Jan. 8, 2021.

U.S. Appl. No. 15/388,212 Office Action dated Jan. 30, 2017.

* cited by examiner

CONTINUOUS UNMANNED AIRBORNE AND UNDERWATER MONITORING PLATFORM

CROSS-REFERENCE TO RELATED APPLICATIONS

This application claims the benefit of U.S. Provisional Application No. 62/580,831, filed Nov. 2, 2017, which application is incorporated herein by reference.

BACKGROUND OF THE INVENTION

Maritime arenas around the world, such as rivers, ports, coastal regions, and the high seas, are currently monitored by such agencies as the Coast Guard, armed service, federal law enforcement agencies, humanitarian services, and the intelligence community, to conduct search operations, monitor for dangerous cargoes, prevent drug and migrant smuggling, enforce fisheries laws, monitor environmental conditions and living marine resources, inspect marine infrastructures, provide navigational aids, and to investigate marine accidents.

It is estimated that 13 million containers, 7,500 foreign vessels, and 200,000 foreigners travel through the ports and bays each year in the United States alone.

The U.S. Coast Guard, which is currently the main institution maintaining the security of U.S. marine areas, requires approximately 1,523 boats, 387 cutters and 187 helicopters and airplanes, and 45,000 personnel to monitor the United States' 95,000 miles of coastline, 12,000 miles of navigable waters, and over 350 ports.

SUMMARY OF THE INVENTION

One aspect provided herein is a continuously unmanned multi-phenomenon sensor system for maritime monitoring comprising a floating base station comprising: a power harvesting element, an unmanned underwater vehicle (UUV) dock, a first sensor configured to generate a first sensor data, an anchor, a communications unit, an energy storage element, and a computer unit; a tethered aerial drone comprising a third sensor configured to generate a third sensor data, a second sensor configured to generate a second sensor data and provide the second sensor data to the floating base station, wherein the second sensor comprises a spatial sensor and wherein the second sensor data comprises a spatial data; the tethered aerial drone: i) connected to the floating base station by a tether, ii) powered by the floating base station via the tether, and iii) configured to provide the third sensor data to the floating base station; and a UUV comprising a fourth sensor configured to generate a fourth sensor data, the UUV: i) powered by the UUV dock and ii) configured to provide the fourth sensor data to the floating base station; wherein the computer unit comprises at least one processor, a memory, an operating system configured to perform executable instructions, and a computer program including instructions executable by the at least one processor to receive the first, second, third, and fourth sensor data, and transmit a signal comprising the first, second, third, and fourth sensor data to a remote monitoring station, via the communications unit; and wherein the system is configured to operate continuously unmanned for a period of time of at least 120 days.

In some embodiments, the system is configured to operate continuously unmanned for a period of time of at most about 250 days. In various embodiments, the system is configured to operate continuously unmanned for a period of time of about 1 day to about 2 days, about 1 day to about 5 days, about 1 day to about 10 days, about 1 day to about 25 days, about 1 day to about 50 days, about 1 day to about 75 days, about 1 day to about 100 days, about 1 day to about 165 days, about 1 day to about 150 days, about 1 day to about 200 days, about 1 day to about 250 days, about 2 days to about 5 days, about 2 days to about 10 days, about 2 days to about 25 days, about 2 days to about 50 days, about 2 days to about 75 days, about 2 days to about 100 days, about 2 days to about 165 days, about 2 days to about 150 days, about 2 days to about 200 days, about 2 days to about 250 days, about 5 days to about 10 days, about 5 days to about 25 days, about 5 days to about 50 days, about 5 days to about 75 days, about 5 days to about 100 days, about 5 days to about 165 days, about 5 days to about 150 days, about 5 days to about 200 days, about 5 days to about 250 days, about 10 days to about 25 days, about 10 days to about 50 days, about 10 days to about 75 days, about 10 days to about 100 days, about 10 days to about 165 days, about 10 days to about 150 days, about 10 days to about 200 days, about 10 days to about 250 days, about 25 days to about 50 days, about 25 days to about 75 days, about 25 days to about 100 days, about 25 days to about 165 days, about 25 days to about 150 days, about 25 days to about 200 days, about 25 days to about 250 days, about 50 days to about 75 days, about 50 days to about 100 days, about 50 days to about 165 days, about 50 days to about 150 days, about 50 days to about 200 days, about 50 days to about 250 days, about 75 days to about 100 days, about 75 days to about 165 days, about 75 days to about 150 days, about 75 days to about 200 days, about 75 days to about 250 days, about 100 days to about 165 days, about 100 days to about 150 days, about 100 days to about 200 days, about 100 days to about 250 days, about 165 days to about 150 days, about 165 days to about 200 days, about 165 days to about 250 days, about 150 days to about 200 days, about 150 days to about 250 days, or about 200 days to about 250 days. In various particular embodiments, the system is configured to operate continuously unmanned for a period of time of at least about 1 day, at least about 2 days, at least about 5 days, at least about 10 days, at least about 25 days, at least about 50 days, at least about 75 days, at least about 100 days, at least about 165 days, at least about 150 days, at least about 200 days, or at least about 250 days, including increments therein.

In some embodiments, the floating base station further comprises at least one of a beacon light, a drone landing element, a wireless mesh router, a speaker, a flag, a GPS sensor, AIS receiver, a GPS beacon, a microphone, and a flare. In some embodiments, at least one of the first sensor, the third sensor, and the fourth sensor comprises an acoustic array, a Geiger counter, an electromagnetic meter, a seismometer, a salinity meter, a humistor, a rain gauge, an anemometer, a flow sensor, a GPS sensor, AIS receiver, a compass, a hydrometer, a pressure sensor, a barometer, a gyroscope, a tide gauge, a thermometer, a camera, a RADAR, a LiDAR, a laser scanner, a sonar, an air pollution sensor, or any combination thereof.

In some embodiments, the acoustic array has a length of about 0.1 meters to about 500 meters. In some embodiments, the acoustic array has a length of at least about 0.1 meters. In some embodiments, the acoustic array has a length of at most about 500 meters. In various embodiments, the acoustic array has a length of about 0.1 meters to about 0.5 meters, about 0.1 meters to about 1 meter, about 0.1 meters to about 5 meters, about 0.1 meters to about 10 meters, about 0.1 meters to about 50 meters, about 0.1 meters to about 100 meters, about 0.1 meters to about 200 meters, about 0.1 meters to about 300 meters, about 0.1 meters to about 400 meters, about 0.1 meters to about 500 meters, about 0.5 meters to about 1 meter, about 0.5 meters to about 5 meters, about 0.5 meters to about 10 meters, about 0.5 meters to about 50 meters, about 0.5 meters to about 100 meters, about 0.5 meters to about 200 meters, about 0.5 meters to about 300 meters, about 0.5 meters to about 400 meters, about 0.5 meters to about 500 meters, about 1 meter to about 5 meters, about 1 meter to about 10 meters, about 1 meter to about 50 meters, about 1 meter to about 100 meters, about 1 meter to about 200 meters, about 1 meter to about 300 meters, about 1 meter to about 400 meters, about 1 meter to about 500 meters, about 5 meters to about 10 meters, about 5 meters to about 50 meters, about 5 meters to about 100 meters, about 5 meters to about 200 meters, about 5 meters to about 300 meters, about 5 meters to about 400 meters, about 5 meters to about 500 meters, about 10 meters to about 50 meters, about 10 meters to about 100 meters, about 10 meters to about 200 meters, about 10 meters to about 300 meters, about 10 meters to about 400 meters, about 10 meters to about 500 meters, about 50 meters to about 100 meters, about 50 meters to about 200 meters, about 50 meters to about 300 meters, about 50 meters to about 400 meters, about 50 meters to about 500 meters, about 100 meters to about 200 meters, about 100 meters to about 300 meters, about 100 meters to about 400 meters, about 100 meters to about 500 meters, about 200 meters to about 300 meters, about 200 meters to about 400 meters, about 200 meters to about 500 meters, about 300 meters to about 400 meters, about 300 meters to about 500 meters, or about 400 meters to about 500 meters. In various particular embodiments, the acoustic array has a length of about 0.1 meters, about 0.5 meters, about 1 meter, about 5 meters, about 10 meters, about 50 meters, about 100 meters, about 200 meters, about 300 meters, about 400 meters, or about 500 meters, including increments therein.

In some embodiments, the first sensor comprises an anemometer and wherein the computer unit is capable of instructing the tethered aerial drone to land or fly depending on a measurement of the anemometer.

In some embodiments, the second sensor comprises a sonar (or sonar array), a laser scanner (or laser scanner array), or any combination thereof. In some embodiments, the sonar comprises a synthetic aperture sonar. In some embodiments, the second sensor is mounted to ground (e.g., sea floor, sea bed, etc.). In some embodiments, wherein the spatial data comprises spatial data associated with a submerged portion of a water vessel. In some embodiments, the second sensor comprises an array of second sensors.

In some embodiments, the number of second sensors in the array of second sensors is about 1 to about 100. In some embodiments, the number of second sensors in the array of second sensors is at least about 1. In some embodiments, the number of second sensors in the array of second sensors is at most about 100. In various embodiments, the number of second sensors in the array of second sensors is about 1 to about 2, about 1 to about 5, about 1 to about 10, about 1 to about 20, about 1 to about 30, about 1 to about 40, about 1 to about 50, about 1 to about 60, about 1 to about 70, about 1 to about 80, about 1 to about 100, about 2 to about 5, about 2 to about 10, about 2 to about 20, about 2 to about 30, about 2 to about 40, about 2 to about 50, about 2 to about 60, about 2 to about 70, about 2 to about 80, about 2 to about 100, about 5 to about 10, about 5 to about 20, about 5 to about 30, about 5 to about 40, about 5 to about 50, about 5 to about 60, about 5 to about 70, about 5 to about 80, about 5 to about 100, about 10 to about 20, about 10 to about 30, about 10 to about 40, about 10 to about 50, about 10 to about 60, about 10 to about 70, about 10 to about 80, about 10 to about 100, about 20 to about 30, about 20 to about 40, about 20 to about 50, about 20 to about 60, about 20 to about 70, about 20 to about 80, about 20 to about 100, about 30 to about 40, about 30 to about 50, about 30 to about 60, about 30 to about 70, about 30 to about 80, about 30 to about 100, about 40 to about 50, about 40 to about 60, about 40 to about 70, about 40 to about 80, about 40 to about 100, about 50 to about 60, about 50 to about 70, about 50 to about 80, about 50 to about 100, about 60 to about 70, about 60 to about 80, about 60 to about 100, about 70 to about 80, about 70 to about 100, or about 80 to about 100. In various particular embodiments, the number of second sensors in the array of second sensors is about 1, about 2, about 5, about 10, about 20, about 30, about 40, about 50, about 60, about 70, about 80, or about 100, including increments therein.

In some embodiments, the length of the array of second sensors is about 0.1 meters to about 500 meters. In some embodiments, the length of the array of second sensors is at least about 0.1 meters. In some embodiments, the length of the array of second sensors is at most about 500 meters. In various embodiments, the length of the array of second sensors is about 0.1 meters to about 0.5 meters, about 0.1 meters to about 1 meter, about 0.1 meters to about 5 meters, about 0.1 meters to about 10 meters, about 0.1 meters to about 50 meters, about 0.1 meters to about 100 meters, about 0.1 meters to about 200 meters, about 0.1 meters to about 300 meters, about 0.1 meters to about 400 meters, about 0.1 meters to about 500 meters, about 0.5 meters to about 1 meter, about 0.5 meters to about 5 meters, about 0.5 meters to about 10 meters, about 0.5 meters to about 50 meters, about 0.5 meters to about 100 meters, about 0.5 meters to about 200 meters, about 0.5 meters to about 300 meters, about 0.5 meters to about 400 meters, about 0.5 meters to about 500 meters, about 1 meter to about 5 meters, about 1 meter to about 10 meters, about 1 meter to about 50 meters, about 1 meter to about 100 meters, about 1 meter to about 200 meters, about 1 meter to about 300 meters, about 1 meter to about 400 meters, about 1 meter to about 500 meters, about 5 meters to about 10 meters, about 5 meters to about 50 meters, about 5 meters to about 100 meters, about 5 meters to about 200 meters, about 5 meters to about 300 meters, about 5 meters to about 400 meters, about 5 meters to about 500 meters, about 10 meters to about 50 meters, about 10 meters to about 100 meters, about 10 meters to about 200 meters, about 10 meters to about 300 meters, about 10 meters to about 400 meters, about 10 meters to about 500 meters, about 50 meters to about 100 meters, about 50 meters to about 200 meters, about 50 meters to about 300 meters, about 50 meters to about 400 meters, about 50 meters to about 500 meters, about 100 meters to about 200 meters, about 100 meters to about 300 meters, about 100 meters to about 400 meters, about 100 meters to about 500 meters, about 200 meters to about 300 meters, about 200 meters to about 400 meters, about 200 meters to about 500 meters, about 300 meters to about 400 meters, about 300 meters to about 500 meters, or about 400 meters to about 500 meters. In various particular embodiments, the length of the array of second sensors is about 0.1 meters, about 0.5 meters, about 1 meter, about 5 meters, about 10 meters, about 50 meters, about 100 meters, about 200 meters, about 300 meters, about 400 meters, or about 500 meters, including increments therein.

In some embodiments, the tethered aerial drone is capable of operating under wind speeds of about 0 knots to about 40 knots. In some embodiments, the tethered aerial drone is capable of operating under wind speeds of at least about 0 knots. In some embodiments, the tethered aerial drone is capable of operating under wind speeds of at most about 40 knots. In various embodiments, the tethered aerial drone is capable of operating under wind speeds of about 0 knots to about 1 knot, about 0 knots to about 2 knots, about 0 knots to about 5 knots, about 0 knots to about 10 knots, about 0 knots to about 15 knots, about 0 knots to about 20 knots, about 0 knots to about 25 knots, about 0 knots to about 30 knots, about 0 knots to about 35 knots, about 0 knots to about 40 knots, about 1 knot to about 2 knots, about 1 knot to about 5 knots, about 1 knot to about 10 knots, about 1 knot to about 15 knots, about 1 knot to about 20 knots, about 1 knot to about 25 knots, about 1 knot to about 30 knots, about 1 knot to about 35 knots, about 1 knot to about 40 knots, about 2 knots to about 5 knots, about 2 knots to about 10 knots, about 2 knots to about 15 knots, about 2 knots to about 20 knots, about 2 knots to about 25 knots, about 2 knots to about 30 knots, about 2 knots to about 35 knots, about 2 knots to about 40 knots, about 5 knots to about 10 knots, about 5 knots to about 15 knots, about 5 knots to about 20 knots, about 5 knots to about 25 knots, about 5 knots to about 30 knots, about 5 knots to about 35 knots, about 5 knots to about 40 knots, about 10 knots to about 15 knots, about 10 knots to about 20 knots, about 10 knots to about 25 knots, about 10 knots to about 30 knots, about 10 knots to about 35 knots, about 10 knots to about 40 knots, about 15 knots to about 20 knots, about 15 knots to about 25 knots, about 15 knots to about 30 knots, about 15 knots to about 35 knots, about 15 knots to about 40 knots, about 20 knots to about 25 knots, about 20 knots to about 30 knots, about 20 knots to about 35 knots, about 20 knots to about 40 knots, about 25 knots to about 30 knots, about 25 knots to about 35 knots, about 25 knots to about 40 knots, about 30 knots to about 35 knots, about 30 knots to about 40 knots, or about 35 knots to about 40 knots. In various particular embodiments, the tethered aerial drone is capable of operating under wind speeds of about 0 knots, about 1 knot, about 2 knots, about 5 knots, about 10 knots, about 15 knots, about 20 knots, about 25 knots, about 30 knots, about 35 knots, or about 40 knots, including increments therein.

In some embodiments, the tethered aerial drone is capable of landing on water or on the floating base station.

In some embodiments, the tether has a length of about 250 meters to about 1,000 meters. In some embodiments, the tether has a length of at least about 250 meters. In some embodiments, the tether has a length of at most about 1,000 meters. In various embodiments, the tether has a length of about 250 meters to about 375 meters, about 250 meters to about 500 meters, about 250 meters to about 625 meters, about 250 meters to about 750 meters, about 250 meters to about 875 meters, about 250 meters to about 1,000 meters, about 375 meters to about 500 meters, about 375 meters to about 625 meters, about 375 meters to about 750 meters, about 375 meters to about 875 meters, about 375 meters to about 1,000 meters, about 500 meters to about 625 meters, about 500 meters to about 750 meters, about 500 meters to about 875 meters, about 500 meters to about 1,000 meters, about 625 meters to about 750 meters, about 625 meters to about 875 meters, about 625 meters to about 1,000 meters, about 750 meters to about 875 meters, about 750 meters to about 1,000 meters, or about 875 meters to about 1,000 meters. In various particular embodiments, the tether has a length of about 250 meters, about 375 meters, about 500 meters, about 625 meters, about 750 meters, about 875 meters, or about 1,000 meters, including increments therein.

In some embodiments, the UUV is capable of operating within a range of at least 20 kilometers of the floating base station. In some embodiments, the UUV is capable of operating within a range of at least 15 kilometers of the floating base station. In some embodiments, the UUV is capable of operating within a range of at least 10 kilometers of the floating base station. In some embodiments, the UUV is capable of operating within a range of at least 5 kilometers of the floating base station. In some embodiments, the range of the UUV is limited by the amount of power that can be stored by the UUV and its ability to communicate with the base station, wherein increased power storage capability and increased signal communication enables an increased range, and wherein an increased range allows for a larger area of inspection and operation.

In some embodiments, the power harvesting element comprises a solar panel, a wave energy converter, a tidal energy converter, a wind turbine, a geothermal turbine, a biomass battery, or any combination thereof.

In some embodiments, the floating base station is capable of operating with an average power consumption of less than 1.5 kW. In some embodiments, the floating base station is capable of operating with an average power consumption of less than 1.75 kW. In some embodiments, the floating base station is capable of operating with an average power consumption of less than 2 kW. In some embodiments, the floating base station is capable of operating with an average power consumption of less than 2.25 kW. In some embodiments, the floating base station is capable of operating with an average power consumption of less than 2.5 kW. In some embodiments, the floating base station is capable of operating with an average power consumption of less than 3 kW. In some embodiments, the floating base station is capable of operating with an average power consumption of less than 4 kW. In some embodiments, the floating base station is capable of operating with an average power consumption of less than 5 kW.

In some embodiments, the energy storage element comprises a compressed air storage element, a flywheel element, a gravitational potential energy element, a hydraulic accumulator element, a capacitor, a supercapacitor, a battery, a fuel cell, a mainspring element, an electromagnetic mass element, a thermal energy storage element, or any combination thereof.

In some embodiments, the floating base station has a width or a length of about 1 meter to about 15 meters. In some embodiments, the floating base station has a width or a length of at least about 1 meter. In some embodiments, the floating base station has a width or a length of at most about 15 meters. In various embodiments, the floating base station has a width or a length of about 1 meter to about 2 meters, about 1 meter to about 4 meters, about 1 meter to about 5 meters, about 1 meter to about 6 meters, about 1 meter to about 7 meters, about 1 meter to about 8 meters, about 1 meter to about 9 meters, about 1 meter to about 10 meters, about 1 meter to about 15 meters, about 1 meter to about 13 meters, about 1 meter to about 15 meters, about 2 meters to about 4 meters, about 2 meters to about 5 meters, about 2 meters to about 6 meters, about 2 meters to about 7 meters, about 2 meters to about 8 meters, about 2 meters to about 9 meters, about 2 meters to about 10 meters, about 2 meters to about 15 meters, about 2 meters to about 13 meters, about 2 meters to about 15 meters, about 4 meters to about 5 meters, about 4 meters to about 6 meters, about 4 meters to about 7 meters, about 4 meters to about 8 meters, about 4 meters to about 9 meters, about 4 meters to about 10 meters, about 4 meters to about 15 meters, about 4 meters to about 13 meters, about 4 meters to about 15 meters, about 5 meters to about 6 meters, about 5 meters to about 7 meters, about 5 meters to about 8 meters, about 5 meters to about 9 meters, about 5 meters to about 10 meters, about 5 meters to about 15 meters, about 5 meters to about 13 meters, about 5 meters to about 15 meters, about 6 meters to about 7 meters, about 6 meters to about 8 meters, about 6 meters to about 9 meters, about 6 meters to about 10 meters, about 6 meters to about 15 meters, about 6 meters to about 13 meters, about 6 meters to about 15 meters, about 7 meters to about 8 meters, about 7 meters to about 9 meters, about 7 meters to about 10 meters, about 7 meters to about 15 meters, about 7 meters to about 13 meters, about 7 meters to about 15 meters, about 8 meters to about 9 meters, about 8 meters to about 10 meters, about 8 meters to about 15 meters, about 8 meters to about 13 meters, about 8 meters to about 15 meters, about 9 meters to about 10 meters, about 9 meters to about 15 meters, about 9 meters to about 13 meters, about 9 meters to about 15 meters, about 10 meters to about 15 meters, about 10 meters to about 13 meters, about 10 meters to about 15 meters, about 15 meters to about 13 meters, about 15 meters to about 15 meters, or about 13 meters to about 15 meters. In various particular embodiments, the floating base station has a width or a length of about 1 meter, about 2 meters, about 4 meters, about 5 meters, about 6 meters, about 7 meters, about 8 meters, about 9 meters, about 10 meters, about 15 meters, about 13 meters, or about 15 meters, including increments therein.

A second aspect provided herein is a continuously unmanned multi-phenomenon marine sensor platform comprising: a plurality of continuously unmanned multi-phenomenon sensor systems each comprising: a floating base station comprising: a power harvesting element, an unmanned underwater vehicle (UUV) dock, a first sensor configured to generate a first sensor data, an anchor, a communications unit, an energy storage element, and a computer unit; a second sensor configured to generate a second sensor data and provide the second sensor data to the floating base station, wherein the second sensor comprises a spatial sensor and wherein the second sensor data comprises a spatial data; a tethered aerial drone comprising a third sensor configured to generate a third sensor data, the tethered aerial drone: i) connected to the floating base station by a tether, ii) powered by the floating base station via the tether, and iii) configured to provide the third sensor data to the floating base station; and a UUV comprising a fourth sensor configured to generate a fourth sensor data, the UUV: i) powered by the UUV dock and ii) configured to provide the fourth sensor data to the floating base station; a remote monitoring station; wherein the computer unit of each continuously unmanned multi-phenomenon sensor system comprises at least one processor, a memory, an operating system configured to perform executable instructions, and a computer program including instructions executable by the at least one processor to receive the first, second, third, and fourth sensor data, and transmit a signal comprising the first, second, third, and fourth sensor data to the remote monitoring station, via the communications unit; and wherein each continuously unmanned multi-phenomenon sensor system is configured to operate continuously unmanned for a period of time of at least 120 days.

In some embodiments, each system is configured to operate continuously unmanned for a period of time of at least 110 days. In some embodiments, each system is configured to operate continuously unmanned for a period of time of at least 100 days. In some embodiments, each system is configured to operate continuously unmanned for a period of time of at least 90 days. In some embodiments, each system is configured to operate continuously unmanned for a period of time of at least 75 days. In some embodiments, each system is configured to operate continuously unmanned for a period of time of at least 50 days. In some embodiments, each system is configured to operate continuously unmanned for a period of time of at least 25 days. In some embodiments, each system is configured to operate continuously unmanned for a period of time of at least 10 days. In some embodiments, each system is configured to operate continuously unmanned for a period of time of at least 5 days.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE INVENTION

In many maritime areas monitoring and inspection is currently performed by a combination of remote unmanned sensors and through manual inspection by governmental and non-governmental service men and women. The resources, fuel, and man-hours required for such currently available maritime monitoring resources, however, are expensive to run and maintain, and may be incapable of simultaneously monitoring large areas of water and coastline. Further such systems require an extensive amount of resources and time to perform such manual operations as monitoring the hulls and contents of all ships at all times before they enter the bay and pose a threat. Additionally, monitoring every vessel entering a harbor would increase waterway traffic and transit durations. As such, there is a current unmet need for a continuously unmanned multi-phenomenon sensor system for maritime monitoring that is capable of surveying and securing rivers, ports, coastal regions, and the high seas without the need for expansive resources or extensive man-hours.

Figure 1:
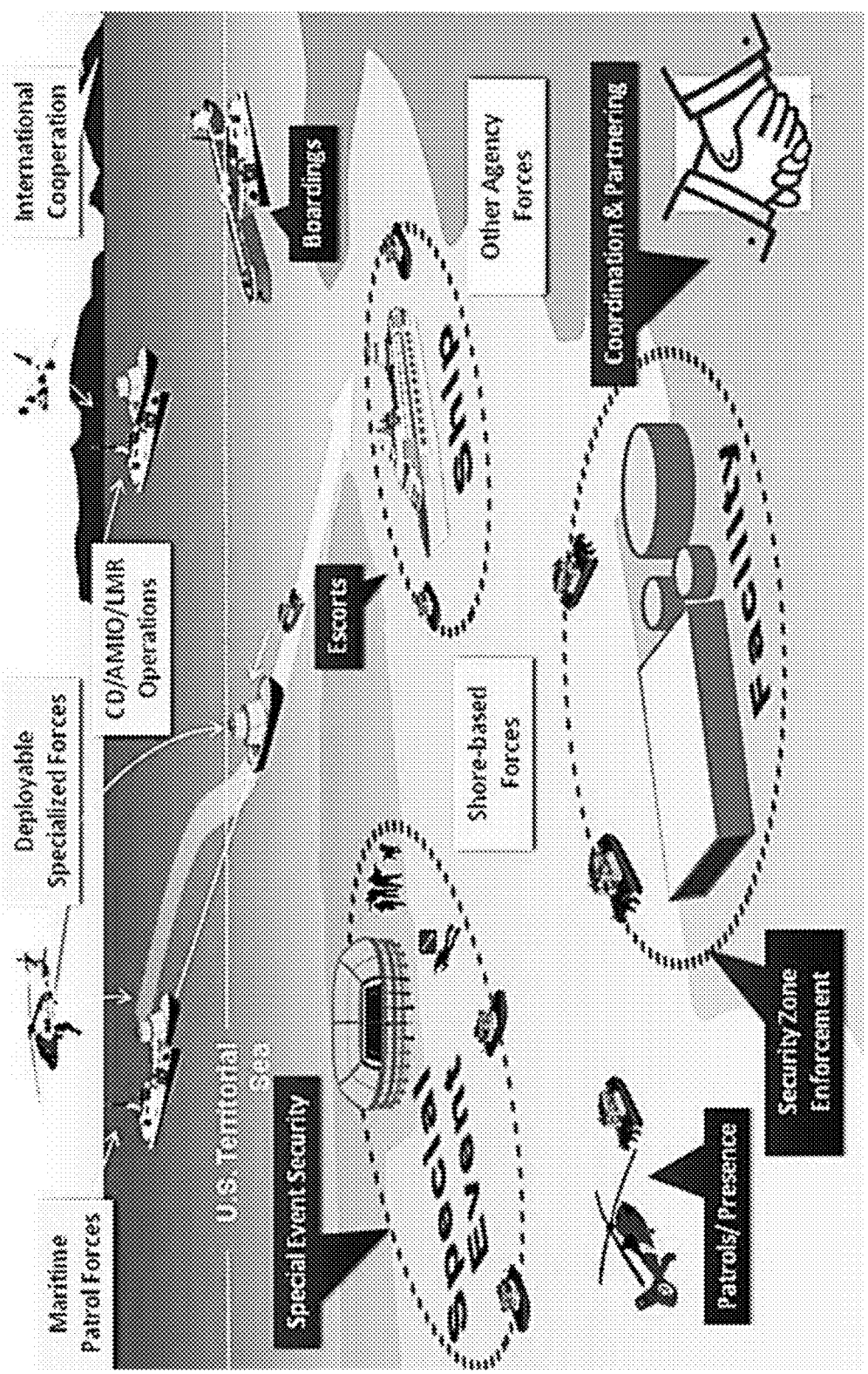
FIG. 1 shows a non-limiting illustration of a current U.S. Coast Guard bay security platform.

FIG. 1 represents a current exemplary configuration of boats, divers, helicopters, and ships required by the U.S. Coast Guard to monitor and maintain special event security, patrol presence, security zone enforcement, ship escorts, ship inspections, patrol forces, and Special Forces.

In some embodiments, the systems and platforms of the instant disclosure can be easily and inexpensively deployed, modified, scaled, and maintained, to provide continuously unmanned airborne and subsea monitoring at multiple points throughout waterways and marine environments. Further, the systems and platforms herein are self-sustaining and environmentally friendly, as no fuel or manpower is required post-instillation, and enables reduced cost multi-phenomenon sensing by collecting multiple unmanned vantage points for efficient monitoring and surveillance.

Continuously Unmanned Multi-Phenomenon Sensor Systems

Figure 2:
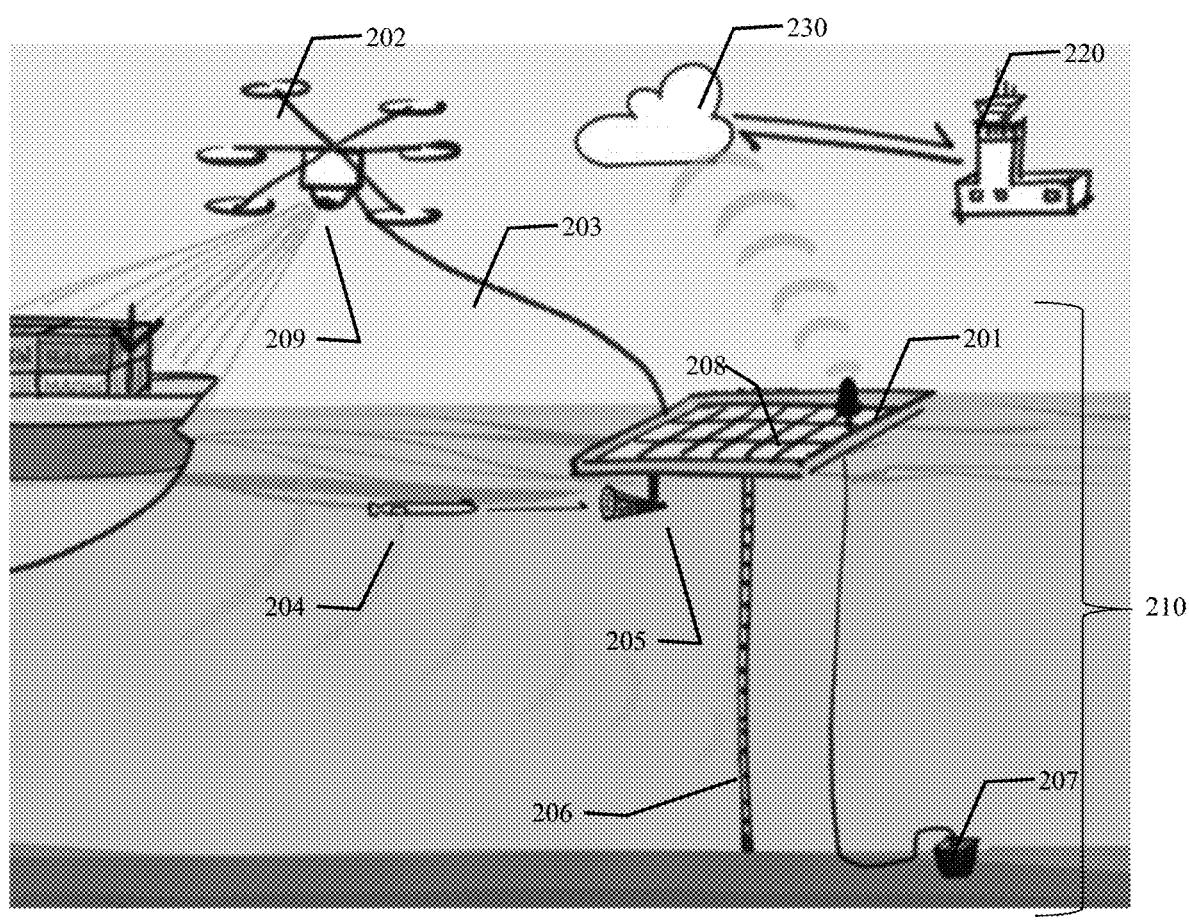
FIG. 2 shows a non-limiting illustration of a first exemplary continuously unmanned multi-phenomenon marine sensor system.
Figure 3:
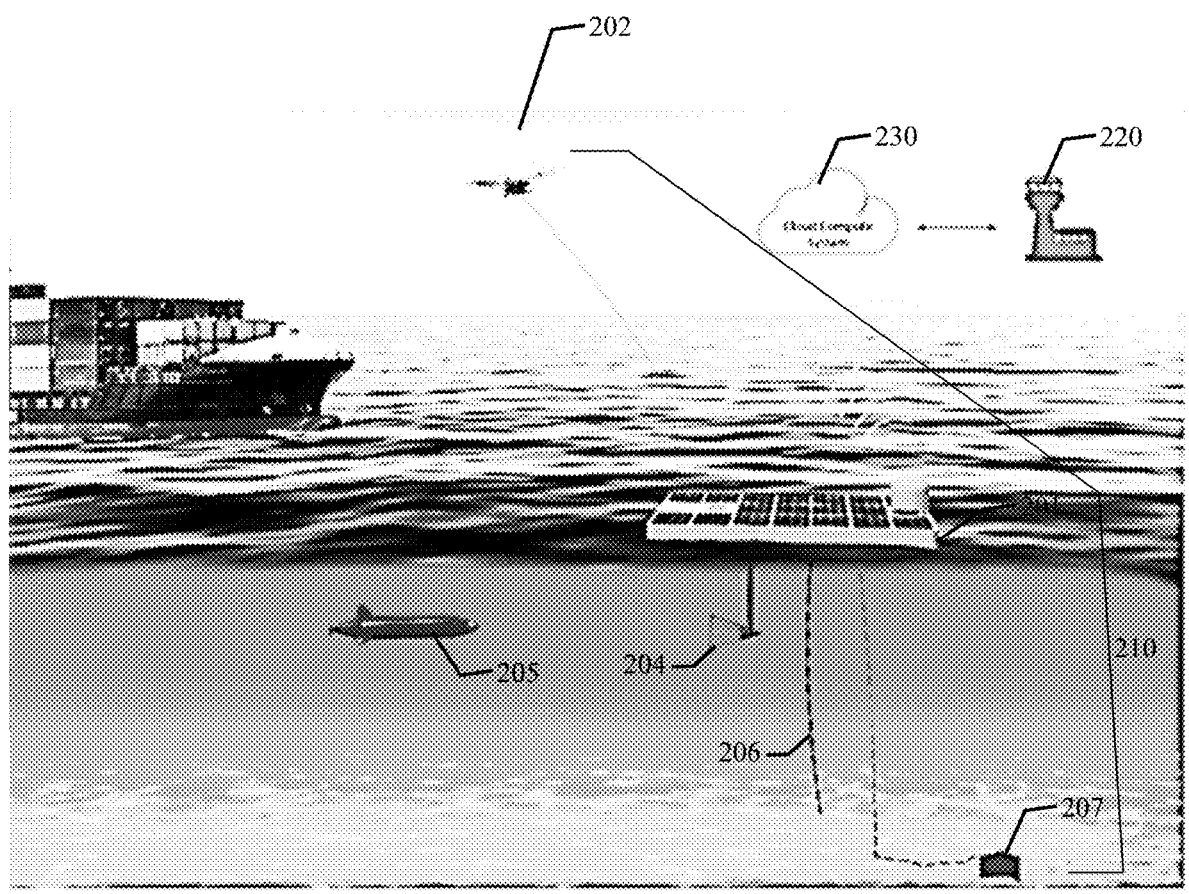
FIG. 3 shows a non-limiting illustration of the subsurface, surface and aerial components of a first exemplary continuously unmanned multi-phenomenon marine sensor system.

Described herein in certain embodiments, per FIGS. 2 and 3, is a first continuously unmanned multi-phenomenon sensor system 210 for maritime monitoring comprising a floating base station 201 comprising: a power harvesting element 208, an unmanned underwater vehicle (UUV) dock 205, a first sensor 206 configured to generate a first sensor data, an anchor 207, a communications unit, an energy storage element, and a computer unit; a tethered aerial drone 202 comprising a third sensor 209 configured to generate a third sensor data, wherein the tethered aerial drone 202 is connected to the floating base station 201 by a tether 203 and powered by the floating base station 201 via the tether 203, and configured to provide the third sensor data to the floating base station 201; and a UUV 204 comprising a fourth sensor configured to generate a fourth sensor data, wherein the UUV 204 is powered by the UUV dock 205 and configured to provide the fourth sensor data to the floating base station 201.

In some embodiments, the power harvesting element 208 allows the system 210 to operate continuously unmanned for a period of time of at least 120 days. In some embodiments, the period of time of 120 days, ensures that the platform of continuously unmanned multi-phenomenon sensor systems are not reliant upon continual charging or battery replacement maneuvers to maintain operational. In some embodiments, increased periods of continuous unmanned operation reduce the amount of man-hours and cost required to maintain and run the platform. In some embodiments, the UUV dock 205 is capable of transmitting power from the power harvesting element 208, through the floating base station 201 to the UUV 204. In some embodiments, the UUV dock 205 is further capable of transmitting data from the floating base station 201 to the UUV 204. In some embodiments, the anchor prevents the system 210 from floating out to sea or into a shipping channel. In some embodiments, the tether 203 between the floating base station 201 and the tethered aerial drone 202, allows for continuous flight and monitoring by the tethered aerial drone 202, without the necessity to land and dock.

In some embodiments, the computer unit comprises at least one processor, a memory, an operating system configured to perform executable instructions, and a computer program including instructions executable by the at least one processor to receive the first, second, third, and fourth sensor data, and transmit a signal comprising the first, second, third, and fourth sensor data to a remote monitoring station 220, via the communications unit.

In some embodiments, the remote monitoring station 220, sends and transmits data to a cloud 230, to store and/or analyze the data received from the system 210.

In some embodiments, the number of continuously unmanned multi-phenomenon marine sensor systems in the continuously unmanned multi-phenomenon marine sensor platform is 1, 2, 3, 4, 5, 6, 7, 8, 9, 10, 11, 12, 13, 14, 15, 16, 17, 18, 19, 20, 30, 40, or more, including increments therein. In some embodiments, the continuously unmanned multi-phenomenon sensor system 210 is capable of operating with an average power consumption of less than 1.25 kW, less than 1.5 kW, less than 1.75 kW, less than 2 kW, less than 2.25 kW, less than 2.5 kW, less than 3 kW, less than 4 kW, or less than 5 kW, including increments therein. In some embodiments, the continuously unmanned multi-phenomenon sensor system 210 is capable of operating at an average power consumption necessary to run the electrical components comprising the first sensor 206, the UUV 204, the tethered aerial drone 202 the communications unit, the energy storage element, and the computer unit. In some embodiments, the electrical components of the continuously unmanned multi-phenomenon sensor system 210 are capable of being powered by a total amount of energy less than the amount of energy that can be garnered from the power harvesting element 208, to ensure continuous unmanned operation. In some embodiments, the size and configuration of the power harvesting element 208, and the floating base station 201 which supports it, are sufficient to power all the electrical components of the continuously unmanned multi-phenomenon sensor system 210.

Figure 9:
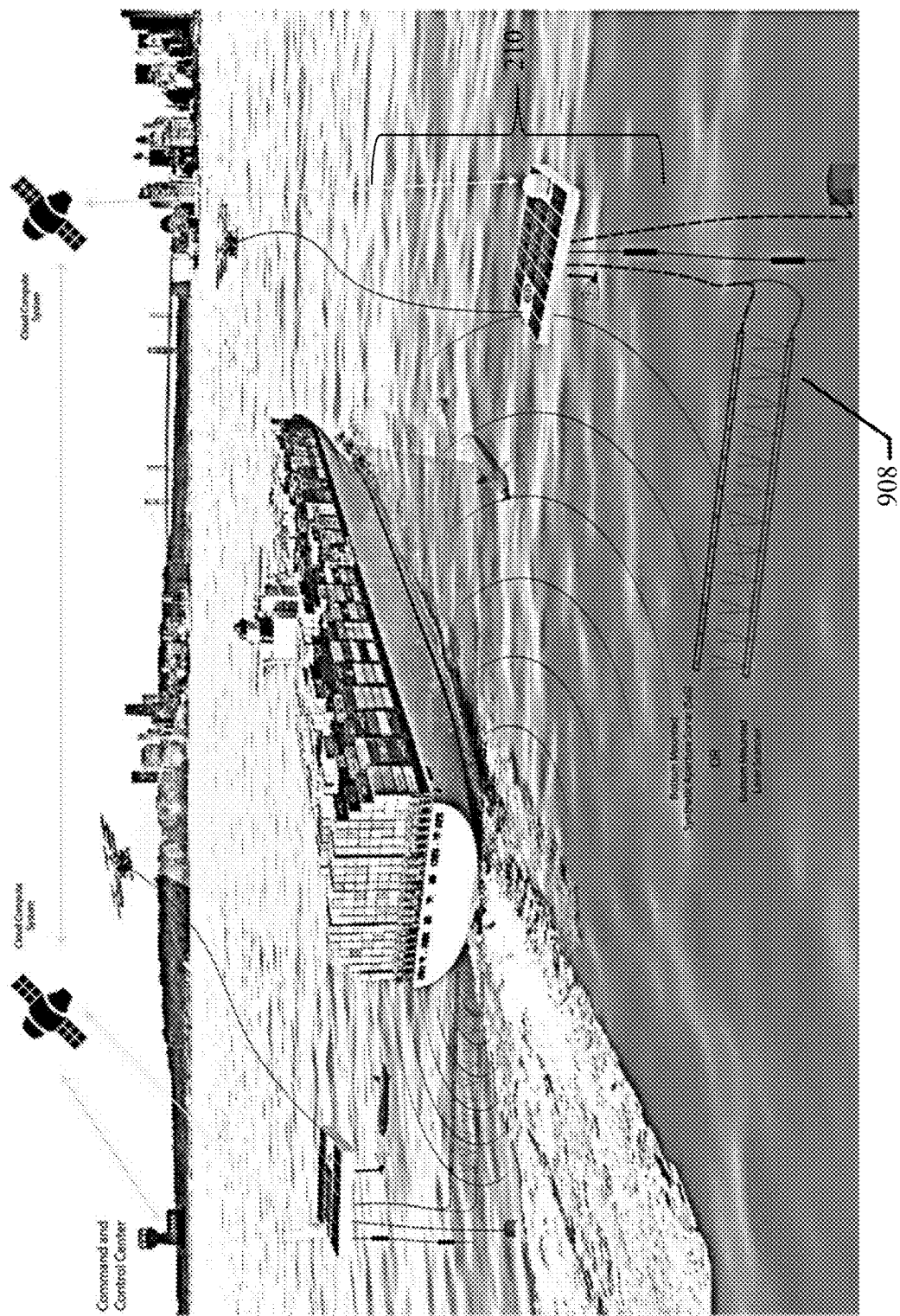
FIG. 9 shows a non-limiting illustration of a second exemplary continuously unmanned multi-phenomenon marine sensor system.
Figure 10:
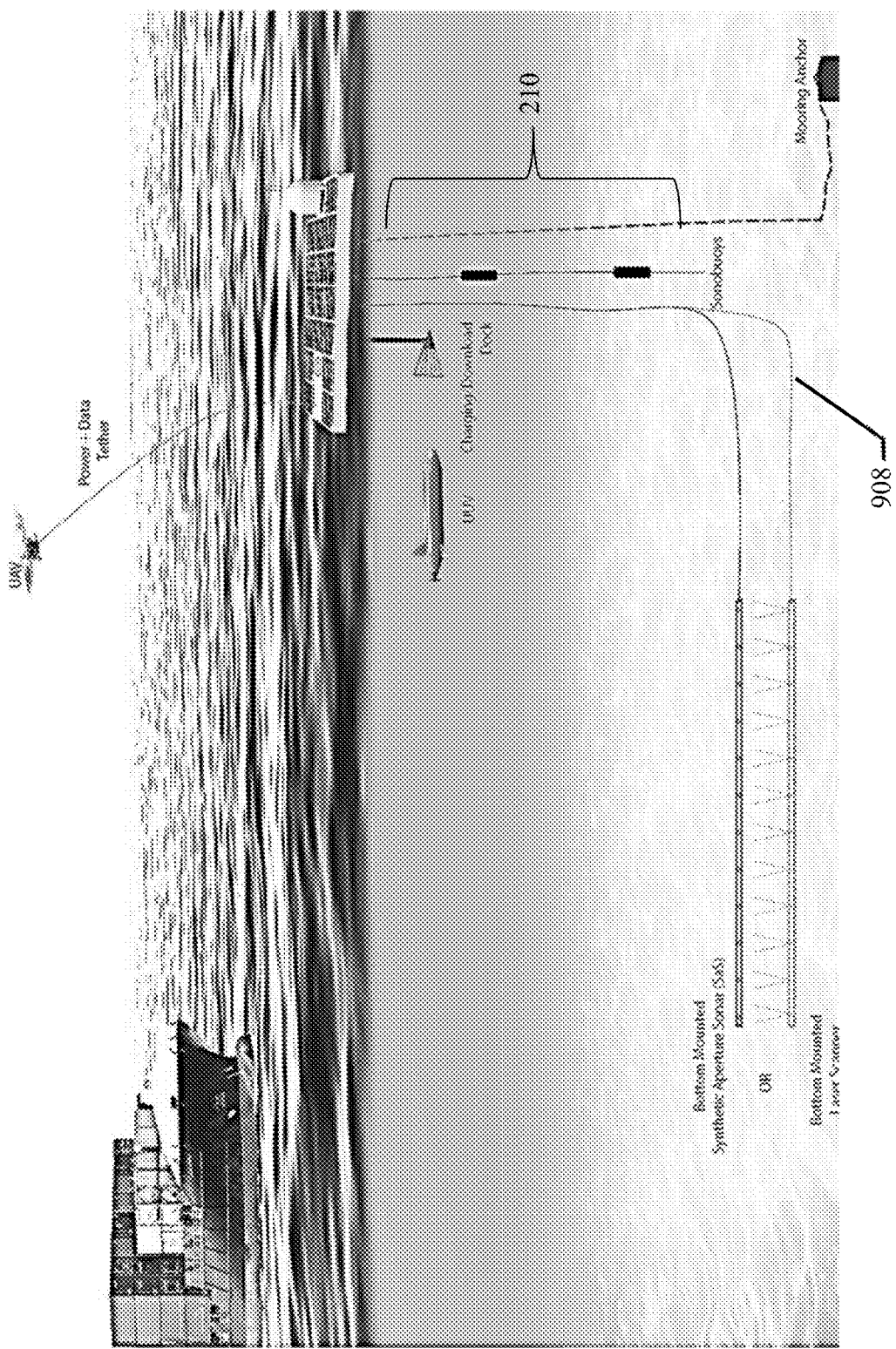
FIG. 10 shows a non-limiting illustration of the subsurface, surface and aerial components of a second exemplary continuously unmanned multi-phenomenon marine sensor system.

In some embodiments, per FIGS. 9 and 10, a second exemplary continuously unmanned multi-phenomenon marine sensor system is equivalent to the first exemplary continuously unmanned multi-phenomenon marine sensor system 210, further comprising a second sensor 908. In some embodiments, the second sensor 908 comprises a sonar, a laser scanner, or any combination thereof. In further embodiments, the sonar comprises a synthetic aperture sonar (synthetic aperture sonar array). In some embodiments, the second sensor 908 is mounted to ground. In some embodiments, the second sensor 908 is mounted to ground by a weight, an anchor, a bolt, a screw, a post, or any combination thereof. In some embodiments, the spatial data comprises spatial data associated with a submerged portion of a water vessel. In some embodiments, the spatial data associated with a submerged portion of a water vessel comprises a hull signature. In some embodiments, the spatial data associated with a submerged portion of a water vessel can be used to detect the presence of a subsurface components attached to the hull of a water vessel.

In some embodiments, the second sensor 908 is positioned towards and generally perpendicular to the shipping lane, to maintain sufficient line of sight with the underside of vessels therein. In some embodiments, the second sensor 908 is positioned by a diver, drone, cable, or any combination thereof, during the installation of the system. In some embodiments, the second sensor 908 comprises a combination of weights and control surfaces to automatically set and maintain the alignment of the second sensor 908 towards the shipping lane. In some embodiments, both a distal and a proximal end of the second sensor 908 maintain contact with the ground. In some embodiments, only the distal end of the second sensor 908 maintains contact with the ground, while the proximal end of the second sensor 908 is suspended above the ground.

Floating Base Station

In some embodiments, floating base station 201 comprises the power harvesting element 208, the unmanned underwater vehicle (UUV) dock, the first sensor 206, the anchor 207, the communications unit, the energy storage element, and the computer unit.

In some embodiments, the floating base station 201 comprises a platform that is capable of staying afloat and above-water under set environmental conditions. In some embodiments, the floating base station maintains the computer. In some embodiments, the set environmental conditions comprise a class of hurricane, a wind speed, a wave height, or any combination thereof. In some embodiments, the floating base station 201 comprises a framework composed of wood, metal, fiberglass, carbon fiber, plastic, or any combination thereof and one or more floats for increased buoyancy. In some embodiments, the shape of the floating base station 201 comprises a circle, a triangle, a square, a pentagon, a hexagon, a polygon, an amorphous shape, or any combination thereof.

In some embodiments, the floating base station 201 has a width or a length of about 1 meter, 2 meters, 3 meters, 5, meters, 7 meters, 9 meters, 10 meters, 11 meters, 12 meters, or more, including increments therein. In some embodiments, the size of the floating base station enables sufficient buoyancy stability, and is necessary to provide adequate room for the power harvesting element 208, the unmanned underwater vehicle (UUV) dock, the first sensor 206, the anchor 207, the communications unit, the energy storage element, and the computer unit. In some embodiments, the power harvesting element 208 comprises a solar panel, wherein the floating base station is configured with an adequate size to contain a solar panel with sufficient size to garner the power necessary to run the components of the continuously unmanned multi-phenomenon sensor system.

In some embodiments, the floating base station 201 further comprises a beacon light, a drone landing element, a wireless mesh router, a speaker, or any combination thereof.

In some embodiments, the floating base station 201 is capable of providing power to the tethered aerial drone 202, the UUV 204, and the first sensor 206. In some embodiments, the floating base station 201 is further capable of providing power to the beacon light, the drone landing element, the wireless mesh router, the speaker, or any combination thereof.

In some embodiments, the floating base station 201 is capable of receiving a first sensor data from the first sensor 206, a third sensor data from the third sensor 207 on the tethered aerial drone 202 through the tether 203, a fourth sensor data from the fourth sensor on the UUV 204, or any combination thereof.

In some embodiments, the floating base station 201 is capable of operating with an average power consumption of less than 1.5 kW. In some embodiments, this reduced power consumption ensures that the components of the system and the floating base station 201 are able to function continuously with the power generated by the power harvester. Further, reduced power consumption creates less electrical strain on the system, and enables a higher factor of safety that the garnered and stored energy are sufficient for continuous operation.

Tethered Aerial Drone

In some embodiments, the tethered aerial drone 202 comprises a tethered unmanned aircraft, which is an unmanned aerial vehicle (UAV) connected by a tether to a point of operation or power. In some embodiments the tethered aerial drone 202 is a component of an unmanned aircraft system (UAS); which includes a UAV, a ground-based controller, and a system of communications between the two. The flight of UAVs may operate with various degrees of autonomy: either under remote control by a human operator or autonomously by onboard computers. In some embodiments, the tether increases the security of the system to prevent loss or damage, and enables continuous flight and detection.

In some embodiments, the tethered aerial drone is capable of operating under wind speeds of 0 knots to 40 knots. In some embodiments, the tethered aerial drone is capable of landing on water or on the floating base station. In some embodiments, the tether has a length of 250 meters to 1,000 meters. In some embodiments, the ability of the tethered aerial drone to operate under wind speeds of 0 knots to 40 knots enables continuous aerial surveillance through inclement weather.

In some embodiments, the number of tethered aerial drones in the continuously unmanned multi-phenomenon sensor system for maritime monitoring is 1, 2, 3, 4, 5, 6, 7, 8, or more.

In some embodiments, the length of the tether enables the tethered aerial drone 202 to fly within a half sphere, with the base station at its center, whose diameter is sufficient to view a portion of the shipping lane from above or at a perspective. In some embodiments, the systems are positioned about a shipping lane to ensure a sufficient amount of drone coverage from both sides of the shipping lane, throughout the shipping lane.

Unmanned Underwater Vehicle

In some embodiments, the UUV 204 comprises an underwater drone or vehicle that is capable of operating underwater without a human occupant. In some embodiments, the UUV comprises a remotely operated underwater vehicle (ROV) controlled by a remote human operator. In some embodiments, the UUV comprises an autonomous underwater vehicle (AUV), which operates robotically and independently of direct human control.

In some embodiments, the UUV is capable of operating within a range of at least 20 kilometers of the floating base station.

In some embodiments, the number of UUVs in the continuously unmanned multi-phenomenon sensor system for maritime monitoring is 1, 2, 3, 4, 5, 6, 7, 8, or more.

Sensors

In some embodiments, at least one of the first sensor 206, the second sensor, the third sensor 207, and the fourth sensor comprises a sensor capable of measuring one or more phenomenon. In some embodiments, at least one of the first sensor, the third sensor, and the fourth sensor comprises an acoustic array, a Geiger counter, an electromagnetic meter, a seismometer, a salinity meter, a humistor, a rain gauge, an anemometer, a flow sensor, a GPS sensor, AIS receiver, a compass, a hydrometer, a pressure sensor, a barometer, a gyroscope, a tide gauge, a thermometer, a camera, a RADAR, a LiDAR, a laser scanner, a sonar, an air pollution sensor, or any combination thereof.

In some embodiments, at least one of the first sensor 206, the second sensor, the third sensor 207, and the fourth sensor is capable of collecting data that can be used to determine the type, size, location, speed, contents, or personnel of a vessel or an animal in the water. In some embodiments, at least one of the first sensor 206, the second sensor, the third sensor 207, and the fourth sensor is capable of recording natural marine phenomenon such as earthquakes, tsunamis, tides, ebbs, flows, hurricanes, cyclones, rain, wind, snow, lightning, or any combination thereof. In some embodiments, at least one of the first sensor 206, the second sensor, the third sensor 207, and the fourth sensor is capable of detecting data related to a threat within a marine area such as a radiation threat, an explosive threat, a human trafficking threat, a naval threat, an illegal immigration threat, a drug trafficking threat, or any combination thereof. In some embodiments, the data captured by at least one of the first sensor 206, the second sensor, the third sensor 207, and the fourth sensor can be stored in the memory in the computer unit aboard the floating base station 201, processed by the processor in the computer unit aboard the floating base station 201, sent to the remote monitoring station 220 via the communications unit aboard the floating base station 201, or any combination thereof. In some embodiments, at least one of the first sensor 206, the second sensor, the third sensor 207, and the fourth sensor comprises a passive sensor. In some embodiments, at least one of the first sensor 206, the second sensor, the third sensor 207, and the fourth sensor comprises an active sensor.

In some embodiments, the first sensor comprises an acoustic array (such as a sonar array) and wherein the acoustic array has a length of about 0.1 meters to about 500 meters. In further embodiments, the acoustic array is oriented vertically in the water column. In some embodiments, the first sensor comprises an anemometer and wherein the computer unit is capable of instructing the tethered aerial drone to land or fly depending on a measurement of the anemometer.

In some embodiments, the second sensor comprises a sonar (or sonar array), a laser scanner (or laser scanner array), or any combination thereof. In further embodiments, the sonar comprises a synthetic aperture sonar (or synthetic aperture sonar array). In some embodiments, the second sensor is mounted to ground. In some embodiments, the second sensor is mounted to ground by a weight, an anchor, a bolt, a screw, a post, or any combination thereof. In some embodiments, the spatial data comprises spatial data associated with a submerged portion of a water vessel. In some embodiments, the spatial data associated with a submerged portion of a water vessel comprises a hull signature. In some embodiments, the spatial data associated with a submerged portion of a water vessel can be used to detect the presence of a subsurface components attached to the hull of a water vessel.

In some embodiments, the second sensor 908 is attached to the floating base station by a tether, a cable, a chain, a rope, or any combination thereof.

In some embodiments, the second sensor comprises an array of second sensors. In some embodiments, the sensors within the array of second sensors 908 are aligned to sense spatial data directly above their position on the ground. In some embodiments, the sensors within the array of second sensors 908 are positioned to sense spatial data at a set angle from the ground for increased line of sight. In some embodiments, the set angle comprises an angle between the ground and a line perpendicular to the shipping lane. In some embodiments, the set angle comprises an angle between the ground and a line parallel to the shipping lane. In some embodiments, the length of the array of second sensors 908 is about 0.1 meters to about 500 meters. In some embodiments, the length of the array of second sensors 908 enables the system to inspect the submerged portions of water vessels within the majority of, or within the entire length of a shipping channel. In some embodiments, the length of the array of second sensors 908 is at least about $\frac{1}{16}$, $\frac{1}{8}$, $\frac{1}{4}$, or $\frac{1}{2}$ the width of the shipping channel. In some embodiments, an increased set angle increases the line of sight of the array of second sensors 908 and thus decreases the array of second sensors 908 length requirement. In some embodiments, the number of sensors on the second sensor 908 ensures continual coverage of a portion of the shipping lane. In some embodiments, the number of second sensor 908 is determined by the view angle of each sensor within the second sensor 908, the width of the shipping lane, and the length of the second sensor 908.

In one non-limiting embodiment, the first sensor comprises a vertical acoustic array and the second sensor comprises a horizontal synthetic aperture sonar. In another non-limiting embodiment, the first sensor comprises a vertical acoustic array and the second sensor comprises a horizontal laser scanner.

Power Harvesting Element

In some embodiments, the power harvesting element 208 comprises a solar panel, a wave energy converter, a tidal energy converter, a wind turbine, a geothermal turbine, a biomass battery, or any combination thereof. In various embodiments, the power harvesting element 208 is capable of harvesting at least about 0.5 kW, at least about 0.75 kW, at least about 1 kW at least about 1.25 kW, at least about 1.5 kW, at least about 1.75 kW, at least about 2 kW, or more, including increments therein.

In some embodiments, the harvesting power is capable of garnering sufficient power to run the components of the system for a continuous period of time. In some embodiments, excess energy generated by the power harvesting element is stored in an energy storage element.

Energy Storage Element

In some embodiments, the energy storage element is capable of storing a quantity of energy or power garnered by the power harvesting element 208. In some embodiments, the energy storage element comprises a compressed air storage element, a flywheel element, a gravitational potential energy element, a hydraulic accumulator element, a capacitor, a supercapacitor, a battery, a fuel cell, a mainspring element, an electromagnetic mass element, a thermal energy storage element, or any combination thereof.

In some embodiments, the energy storage element allows power to be garnered at a specific time and be used at a different time, wherein, for example, solar energy harvested during the day can be used during the night when such a form of energy is unavailable.

Continuously Unmanned Multi-Phenomenon Sensor Platforms

Figure 4:
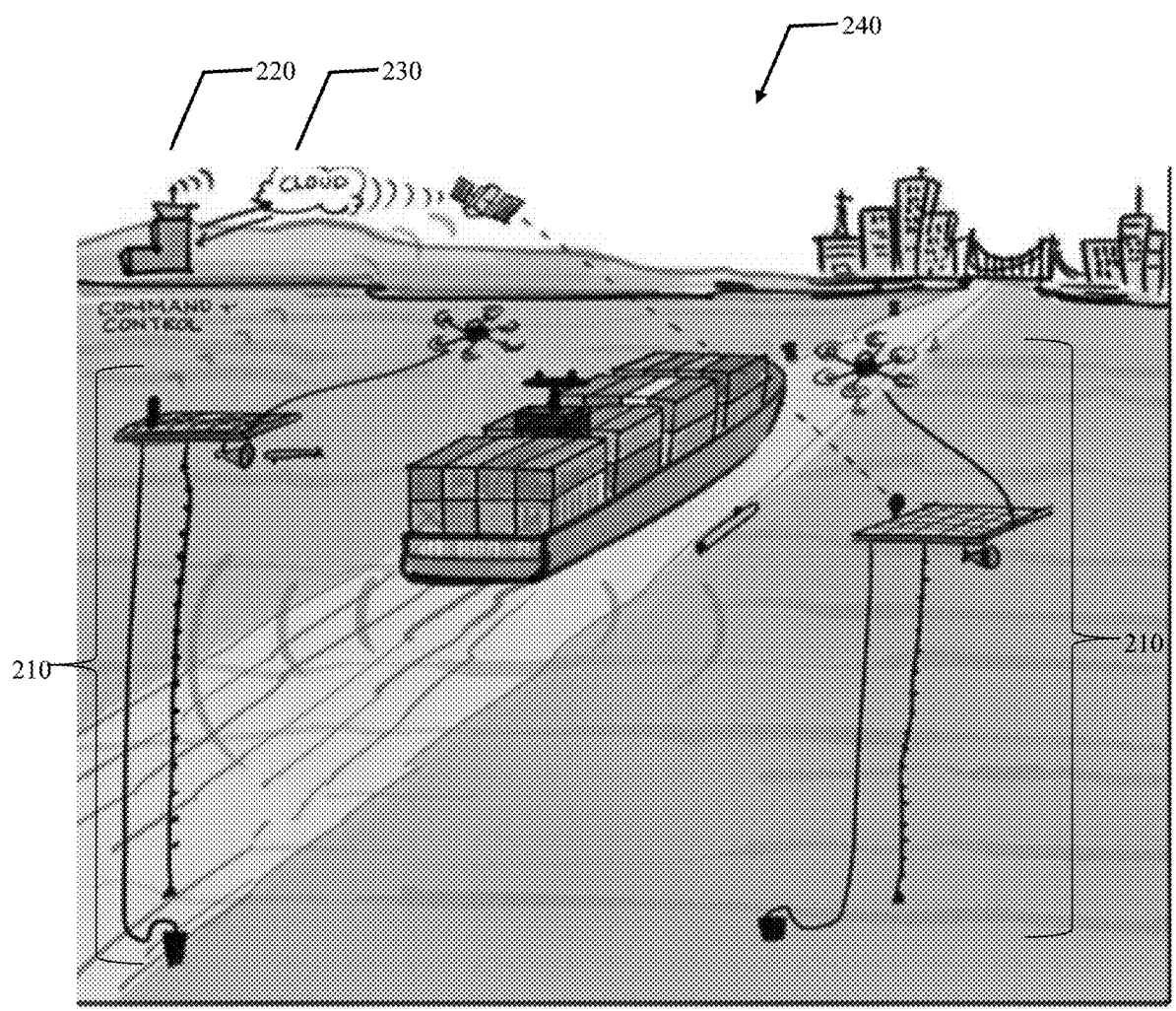
FIG. 4 shows a non-limiting illustration of a first exemplary continuously unmanned multi-phenomenon marine sensor platform comprising two unmanned multi-phenomenon sensor systems.
Figure 5:
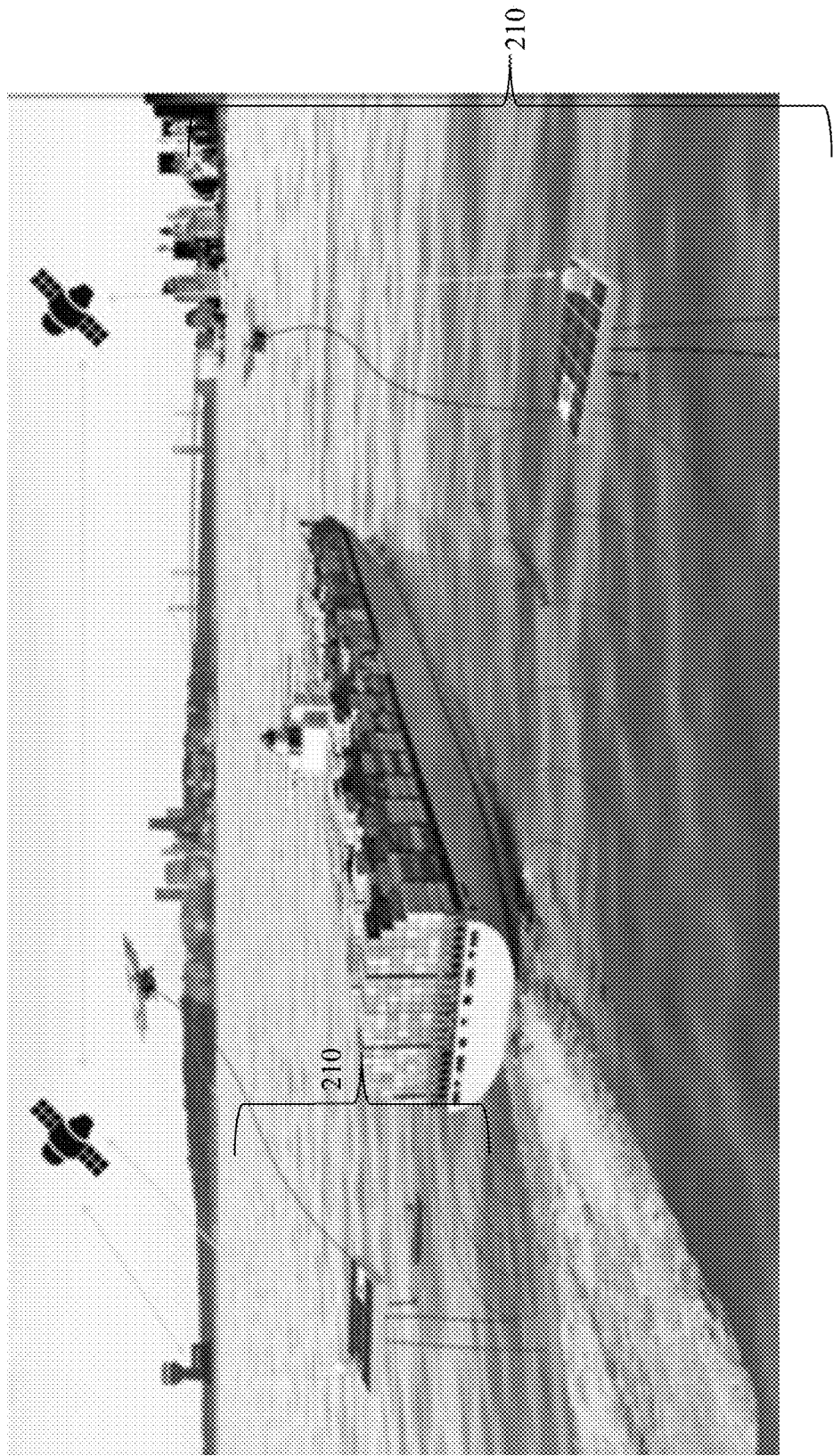
FIG. 5 shows a non-limiting illustration of the subsurface, surface and aerial components of a first exemplary continuously unmanned multi-phenomenon marine sensor platform monitoring a shipping channel.

Also described herein in certain embodiments, per FIGS. 4 and 5, is a continuously unmanned multi-phenomenon marine sensor platform 240 comprising a plurality of continuously unmanned multi-phenomenon sensor systems 210 each comprising: a floating base station comprising: a power harvesting element, an unmanned underwater vehicle (UUV) dock, a first sensor configured to generate a first sensor data, an anchor, a communications unit, an energy storage element, and a computer unit; a tethered aerial drone comprising a third sensor configured to generate a third sensor data, the tethered aerial drone: connected to the floating base station by a tether, powered by the floating base station via the tether, and configured to provide the third sensor data to the floating base station; and a UUV comprising a fourth sensor configured to generate a fourth sensor data, the UUV powered by the UUV dock and configured to provide the fourth sensor data to the floating base station; a remote monitoring station.

In some embodiments, the computer unit of each continuously unmanned multi-phenomenon sensor system comprises at least one processor, a memory, an operating system configured to perform executable instructions, and a computer program including instructions executable by the at least one processor to receive the first, second, third, and fourth sensor data, and transmit a signal comprising the first, second, third, and fourth sensor data to the remote monitoring station, via the communications unit.

In some embodiments, each continuously unmanned multi-phenomenon sensor system is configured to operate continuously unmanned for a period of time of at least 120 days. In some embodiments, the system is configured to operate continuously unmanned for a period of time of about 1 day to about 250 days. In some embodiments, the system is configured to operate continuously unmanned for a period of time of at least about 1 day. In some embodiments, the continuously unmanned multi-phenomenon sensor platform 240 comprises one or more continuously unmanned multi-phenomenon sensor systems 210 on each side of a shipping channel, wherein the UUV is capable of positioning itself below and around the ship, such that the first sensor is capable of monitoring a content aboard the ship, and wherein the tethered aerial drone is capable of positioning itself above and around a ship in the shipping channel, such that the third sensor is capable of monitoring a content aboard the ship.

Figure 6:
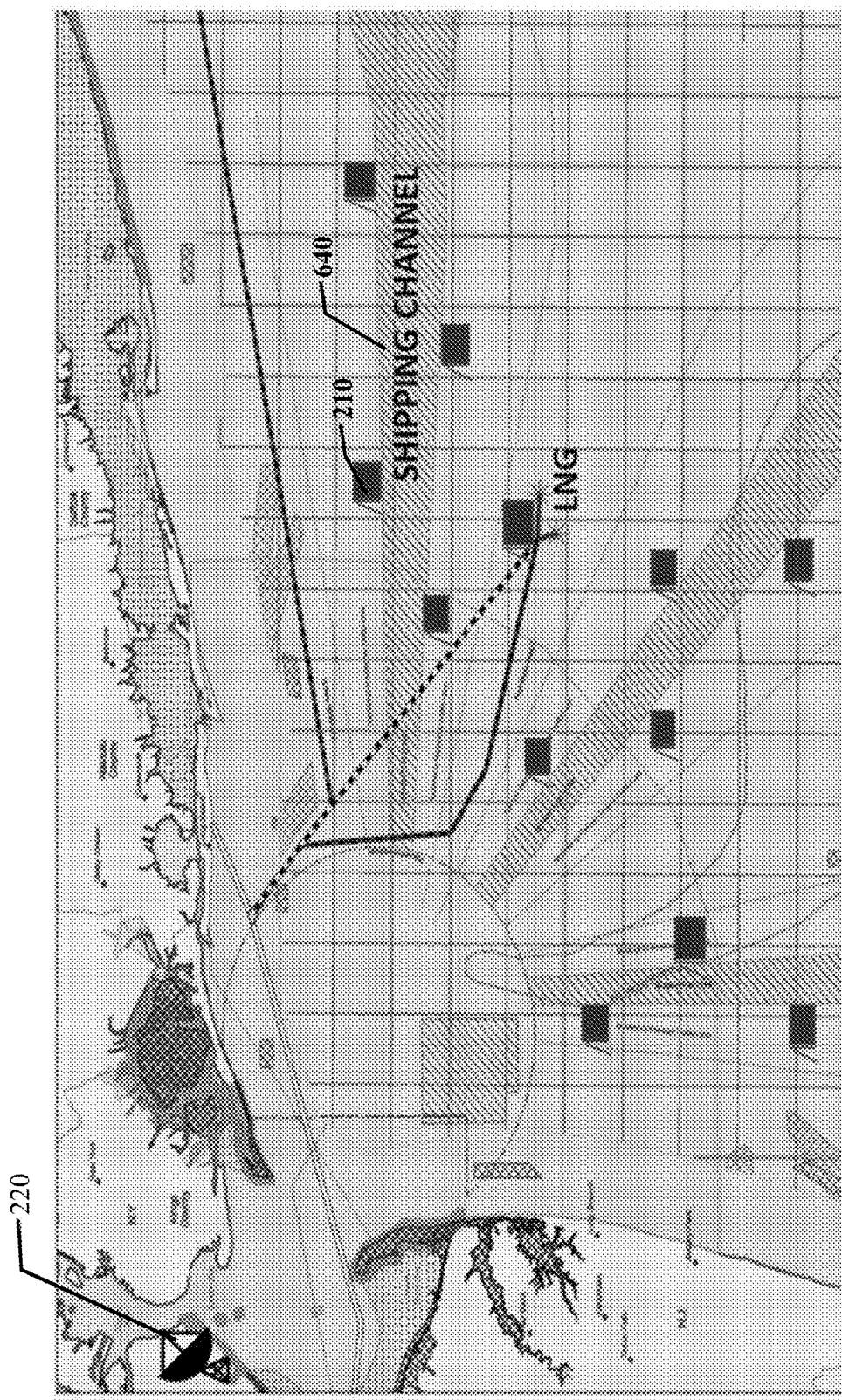
FIG. 6 shows a non-limiting illustration of a first exemplary unmanned multi-phenomenon sensor platform comprising an arrangement of unmanned multi-phenomenon sensor systems about shipping channels in a bay.

FIG. 6 displays an exemplary continuously unmanned multi-phenomenon marine sensor platform 240 comprising a plurality of continuously unmanned multi-phenomenon sensor systems 210 positioned about multiple shipping channels 640 and natural gas lines (LNG) within a bay, to ensure multiple points of surveillance within key locations of transportation and business.

In some embodiments, the continuously unmanned multi-phenomenon marine sensor platform 240 is capable of detecting and deterring maritime attacks and acts of terrorism, simultaneously monitoring the movement and contents of multiple vessels in a bay, port or shipping lane, and surveying environmental and marine life conditions.

Sensor System Cloud Agglomeration and Dissemination

Figure 7:
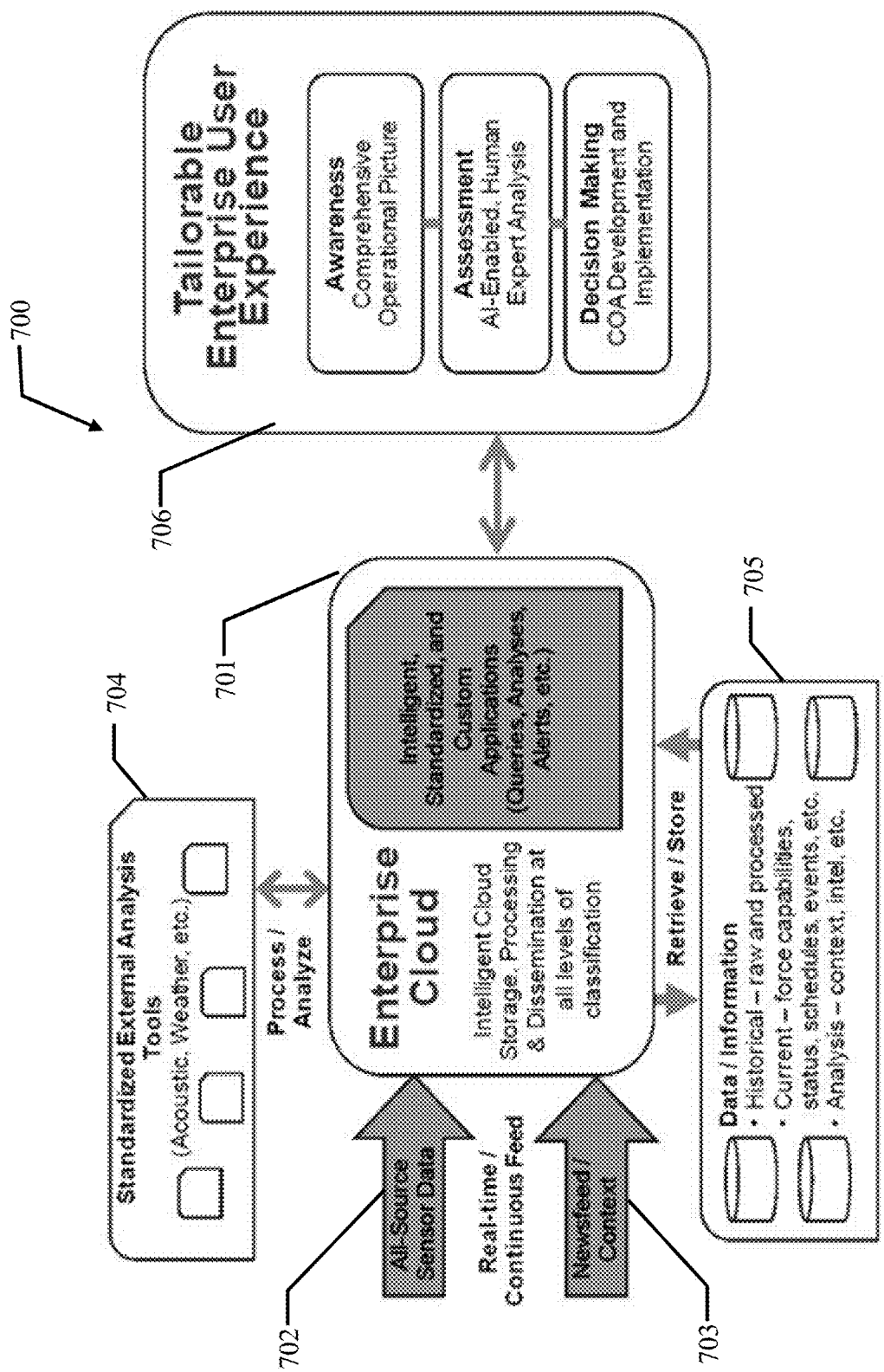
FIG. 7 shows a non-limiting illustration of a first exemplary flowchart of an enterprise cloud system.

In some embodiments, an enterprise cloud system 700 is employed to agglomerate and present data received from the continuously unmanned multi-phenomenon marine sensor platform and other sources. An exemplary enterprise cloud system, per FIG. 7, comprises an enterprise cloud 701, which is capable of receiving an all-source sensor data 702 comprising the first, second, third, and fourth sensor data, from one or more continuously unmanned multi-phenomenon marine sensor systems in the continuously unmanned multi-phenomenon marine sensor platform and a newsfeed data 703.

In some embodiments, the newsfeed data 703 comprises a weather data, a location event data, an anticipated threat data, or any other data regarding the state of marine area.

In some embodiments, the enterprise cloud 701 sends a portion of the all-source sensor data 702 and the newsfeed data 703 to a standardized external analysis tool 704, and receives an analyzed form of the raw all-source sensor data 702, and the newsfeed data 703.

In some embodiments, the enterprise cloud 701 sends a portion of the raw and/or analyzed all-source sensor data 702 and the newsfeed data 703 to data storage 705, for learning and archival purposes. In some embodiments, the enterprise cloud 701 further receives information from the data storage 705, related to historical trends, infrastructure capabilities, past events, or any combination thereof.

In some embodiments, the enterprise cloud 701 further comprises a tailoring module 706 capable of receiving and compiling the raw and/or analyzed all-source sensor data 702 and the newsfeed data 703 to form an operational picture, perform artificial intelligence (AI)-enabled or human assisted analysis, yield development and implementation decisions, or any combination thereof.

Figure 8:
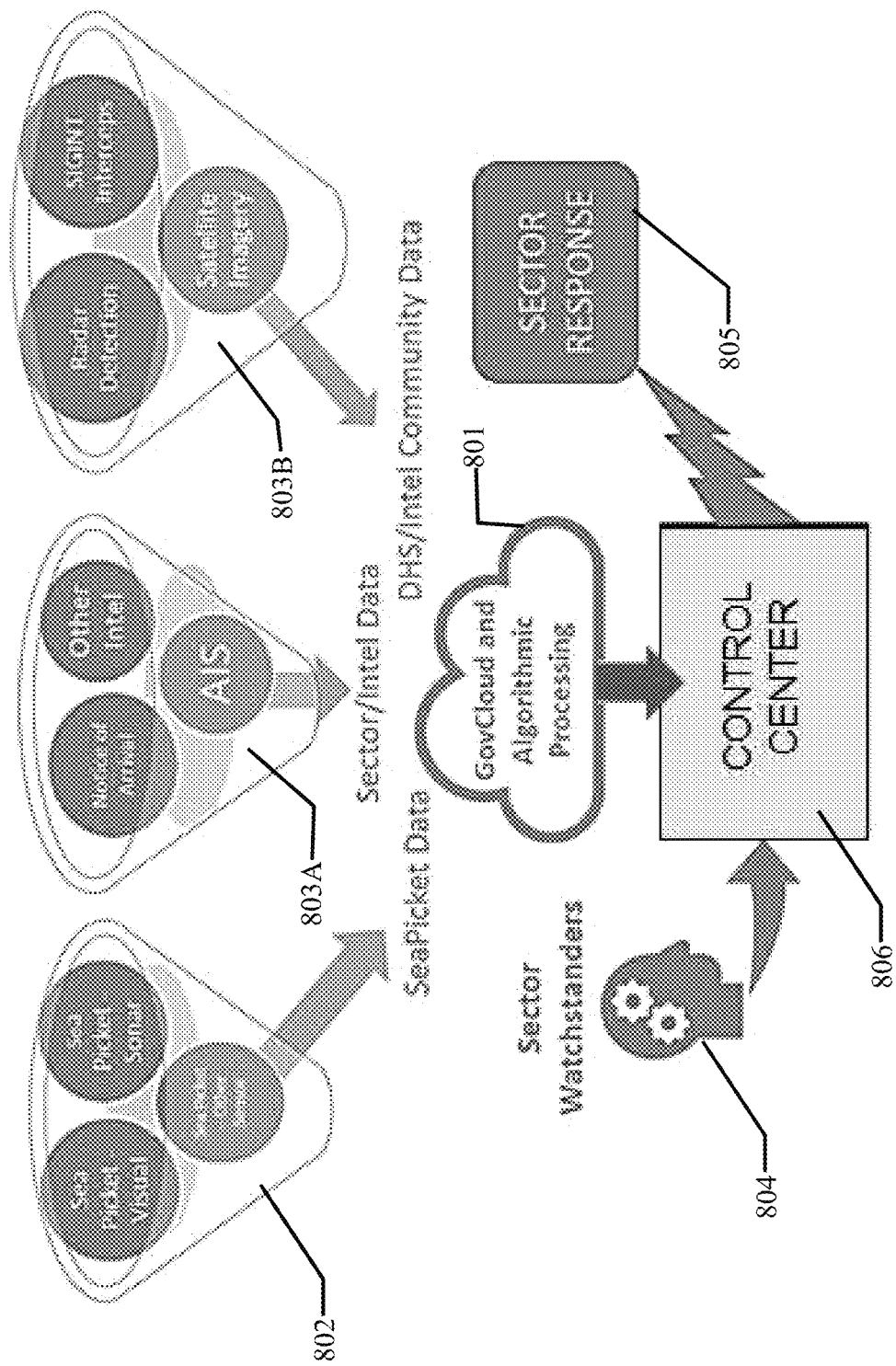
FIG. 8 shows a non-limiting illustration of a second exemplary flowchart of an enterprise cloud system.

FIG. 8 displays another exemplary enterprise cloud system, wherein a GovCloud algorithmic processor 801 compiles and analyzes the all-source sensor data 802 from one or more continuously unmanned multi-phenomenon marine sensor systems in the continuously unmanned multi-phenomenon marine sensor platform, a first newsfeed data 803A, and a second newsfeed data 803B. In some embodiments, a control center 806 sends the data processed by the GovCloud algorithmic processor 801, along with manually entered or AI-detected sector WatchStander data 804, to a sector response 805. In some embodiments, the sector response comprises a message to one or more administrators comprising a status, a warning, or any combination thereof. In some embodiments, the first newsfeed data 803A comprises a notice of arrival, an automatic identification system data (AIS) a source of intelligence, or any combination thereof. In some embodiments, the second newsfeed data 803B comprise RADAR data, signals intelligence (SIGINT) data, satellite imagery, or any combination thereof.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

As used herein, the term "multi-phenomenon" refers to an ability to measure multiple sources of information with one or more sensors, wherein a source of information comprises a source of sound, a source of light, a source of color, a source of a chemical, a source of a vibration, a source of magnetism, a source of energy, a source of heat, a source of pressure, a source of electrostatics, or any other source or medium of information.

As used herein, the term "GovCloud" refers to cloud computing and virtualization products and solutions that are developed specifically for government organizations and institutions and are subject to FedRAMP High and Moderate baselines that allow customers to host sensitive Controlled Unclassified Information (CUI) and various types of regulated workloads.

As used herein, the term "synthetic aperture sonar" refers to a form of sonar in which post-processing of sonar data are used in ways closely analogous to synthetic aperture radar.

As used herein, the term "AIS receiver" refers to the automatic identification system, which is an automatic tracking system used on ships and by vessel traffic services. In some embodiments, the AIS comprises a Satellite-AIS when satellites are used to detect AIS signatures. In some embodiments AIS allows for the monitoring of large ships and vessels.

Computer

In some embodiments, the platforms, systems, media, and methods described herein include a computer, or use of the same. In further embodiments, the computer includes one or more hardware central processing units (CPUs) or general purpose graphics processing units (GPGPUs) that carry out the device's functions. In still further embodiments, the computer further comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the computer includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the computer includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the computer, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the computer includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 11:
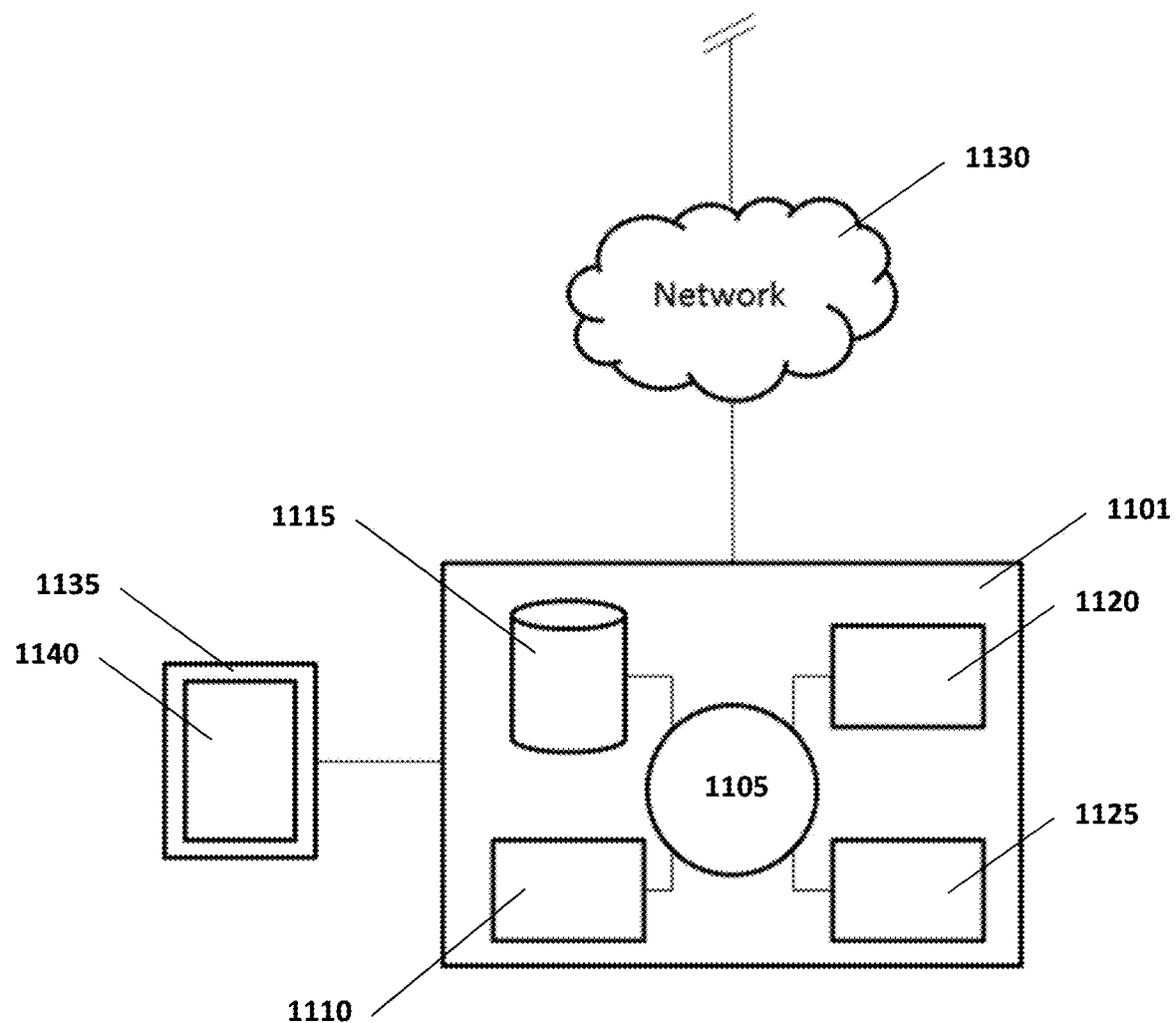
FIG. 11 shows a non-limiting example of a computer; in this case, a device with one or more CPUs, a memory, a communication interface, and a display.

Referring to FIG. 11, in a particular embodiment, a computer 1101 is programmed or otherwise configured to receive the first, second, third, and fourth sensor data, and transmit a signal comprising the first, second, third, and fourth sensor data to a remote monitoring station, via the communications unit. In this embodiment, the computer 1101 includes a central processing unit (CPU, also "processor" and "computer processor" herein) 1105, which is optionally a single core, a multi core processor, or a plurality of processors for parallel processing. The computer 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 comprises a data storage unit (or data repository)

for storing data. The computer 1101 is optionally operatively coupled to a computer network ("network") 1130 with the aid of the communication interface 1120. The network 1130, in various cases, is the internet, an internet, and/or extranet, or an intranet and/or extranet that is in communication with the internet. The network 1130, in some cases, is a telecommunication and/or data network. The network 1130 optionally includes one or more computer servers, which enable distributed computing, such as cloud computing. The network 1130, in some cases, with the aid of the device 1101, implements a peer-to-peer network, which enables devices coupled to the device 1101 to behave as a client or a server.

Continuing to refer to FIG. 11, the CPU 1105 is configured to execute a sequence of machine-readable instructions, embodied in a program, application, and/or software. The instructions are optionally stored in a memory location, such as the memory 1110. The instructions are directed to the CPU 1105, which subsequently program or otherwise configure the CPU 1105 to implement methods of the present disclosure. Examples of operations performed by the CPU 1105 include fetch, decode, execute, and write back. The CPU 1105 is, in some cases, part of a circuit, such as an integrated circuit. One or more other components of the device 1101 are optionally included in the circuit. In some cases, the circuit is an application specific integrated circuit (ASIC) or a field programmable gate array (FPGA).

Continuing to refer to FIG. 11, the storage unit 1115 optionally stores files, such as drivers, libraries and saved programs. The storage unit 1115 optionally stores user data, e.g., user preferences and user programs. The computer 1101, in some cases, includes one or more additional data storage units that are external, such as located on a remote server that is in communication through an intranet or the internet.

Continuing to refer to FIG. 11, the computer 1101 optionally communicates with one or more remote computer systems through the network 1130. For instance, the device 1101 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Methods as described herein are optionally implemented by way of machine (e.g., computer processor) executable code stored on an electronic storage location of the computer 1101, such as, for example, on the memory 1110 or electronic storage unit 1115. The machine executable or machine readable code is optionally provided in the form of software. During use, the code is executed by the processor 1105. In some cases, the code is retrieved from the storage unit 1115 and stored on the memory 1110 for ready access by the processor 1105. In some situations, the electronic storage unit 1115 is precluded, and machine-executable instructions are stored on the memory 1110.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 12:
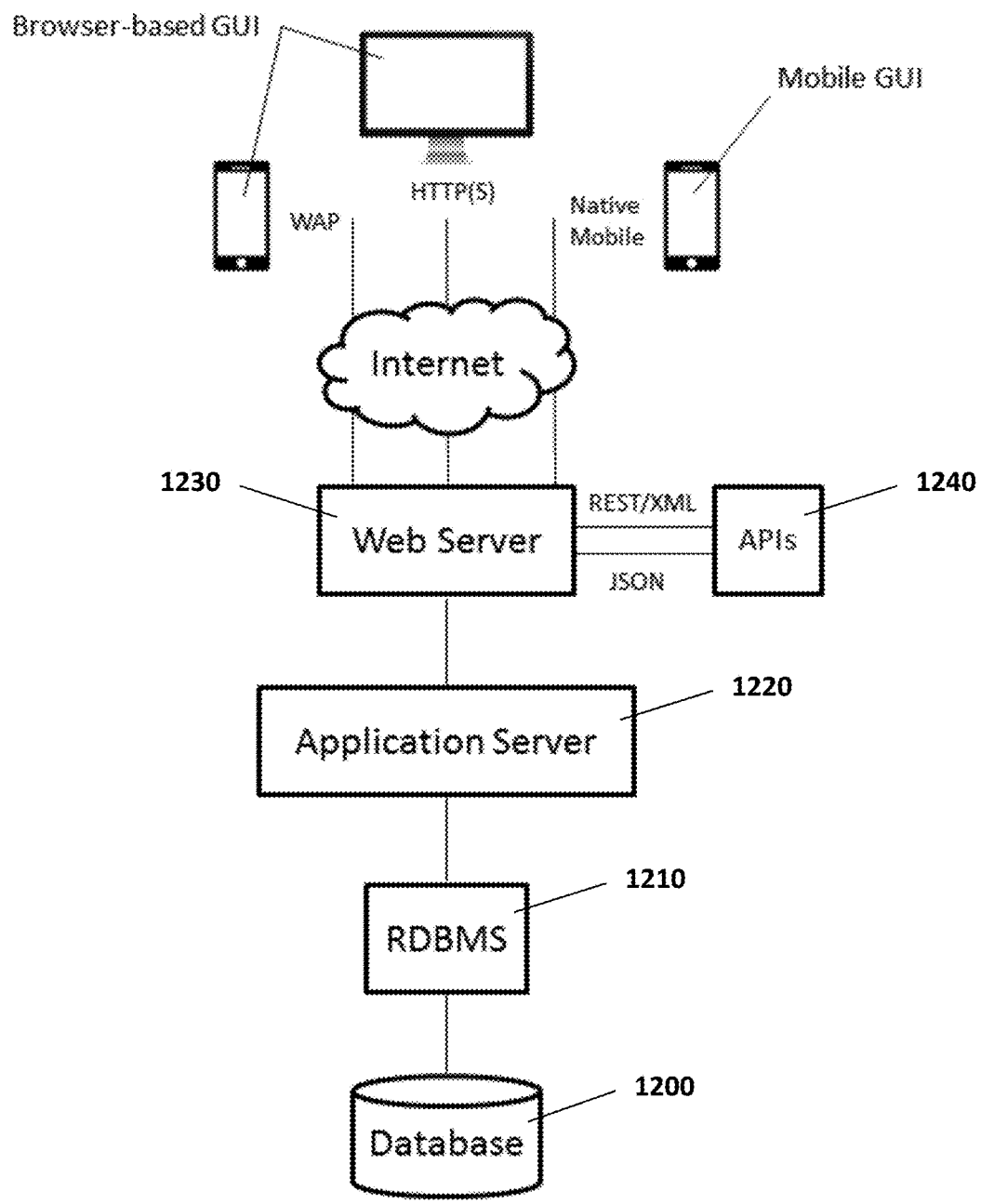
FIG. 12 shows a non-limiting example of a web/mobile application provision system; in this case, a system providing browser-based and/or native mobile user interfaces.

Referring to FIG. 12, in a particular embodiment, an application provision system comprises one or more databases 1200 accessed by a relational database management system (RDBMS) 1210. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1220 (such as Java servers, .NET servers, PHP servers, and the like) and one or more web servers 1230 (such as Apache, IIS, GWS and the like). The web server(s) optionally expose one or more web services via app application programming interfaces (APIs) 1240 via a network, such as the internet, the system provides browser-based and/or mobile native user interfaces.

Figure 13:
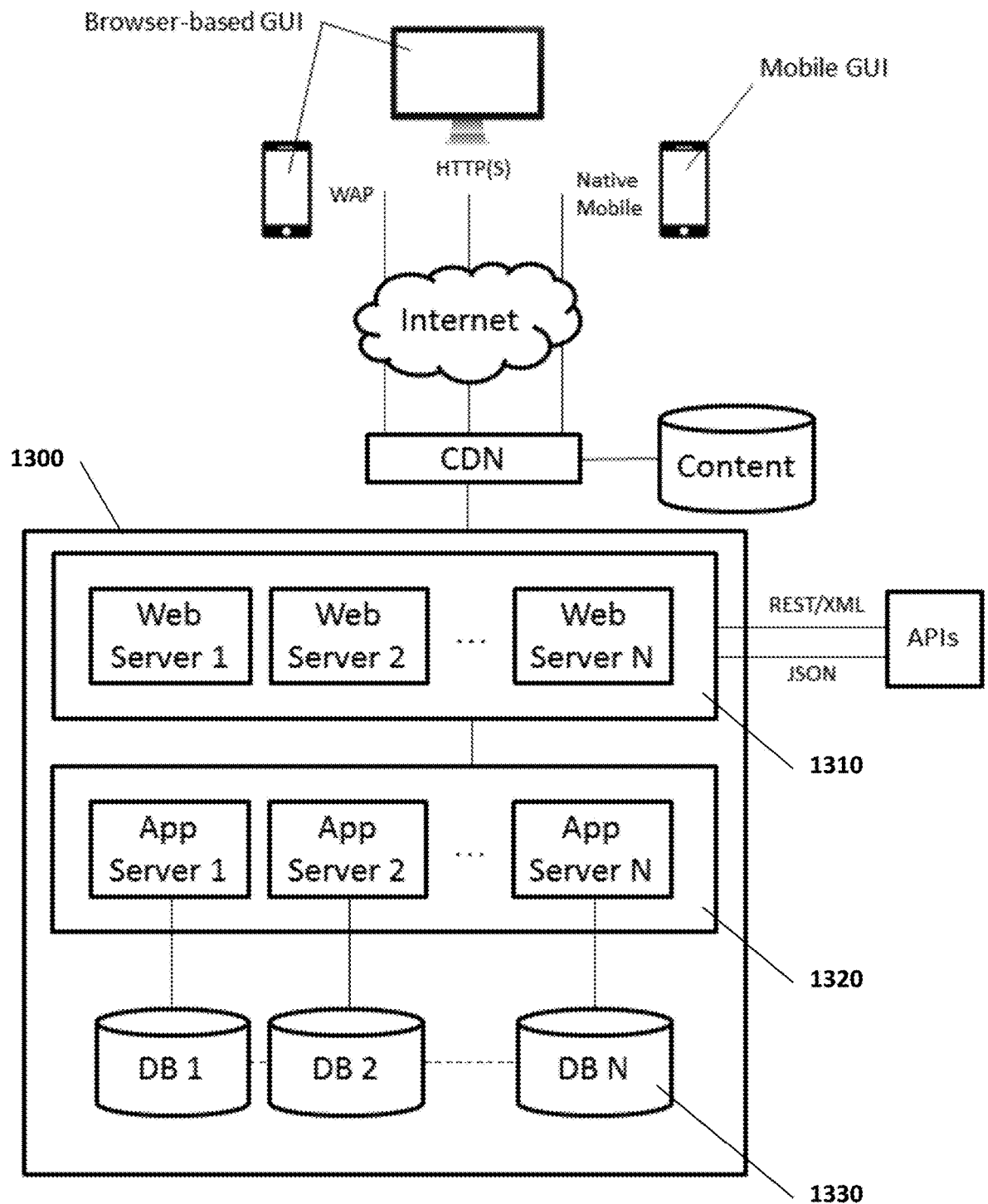
FIG. 13 shows a non-limiting example of a cloud-based web/mobile application provision system; in this case, a system comprising an elastically load balanced, auto-scaling web server, and application server resources, as well synchronously replicated databases.

Referring to FIG. 13, in a particular embodiment, an application provision system alternatively has a distributed, cloud-based architecture 1300 and comprises elastically load balanced, auto-scaling web server resources 1310, and application server resources 1320 as well synchronously replicated databases 1330.

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for receiving weather, maritime, environmental, civil, governmental or military data. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1—Preparation for Known Threat

The U.S. Coast Guard is alerted by the New York Port Authority that a suspicious ship is en route to New York Bay and will arrive in five days. In addition to the existing continuously unmanned multi-phenomenon marine sensor systems throughout the bay, the Coast Guard decides to employ additional systems along a shipping channel for further monitoring. Two days before the expected arrival of the ship, four systems are deposited into the bay, each comprising multiple radiation and electromagnetic sensors, and communication with the remote monitoring station is confirmed. When the ship arrives, one or more operators man and direct each of the systems to visually inspect the hull and containers, and to collect aerial sensor data, via the tethered aerial drone, and subsea data, via the UUV. The real-time video feeds and the sensor data, along with data from additional sensors, boats, buoys, and newsfeeds are compiled and disseminated to a Coast Guard officer for review. The data is additionally stored, wherein the stored data is compared with previous data about that ship and other vessels in its class. Some of the data is sent to external sources to analyze the sensor data for patterns and indications. Throughout the monitoring process, the officer can modify the user experience to view the collected and analyzed data in a variety of graphs, charts, images and parameters displays.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A continuously unmanned multi-phenomenon sensor system for maritime monitoring comprising:
   a) a floating base station comprising: a power harvesting element, an unmanned underwater vehicle (UUV) dock, a first sensor configured to generate a first sensor data, an anchor, a communications unit, an energy storage element, and a computer unit;
   b) a second sensor configured to generate a second sensor data and provide the second sensor data to the floating base station, wherein the second sensor comprises a spatial sensor and wherein the second sensor data comprises a spatial data;
   c) a tethered aerial drone comprising a third sensor configured to generate a third sensor data, the tethered aerial drone: i) connected to the floating base station by a tether, ii) powered by the floating base station via the tether, and iii) configured to provide the third sensor data to the floating base station; and
   d) a UUV comprising a fourth sensor configured to generate a fourth sensor data, the UUV: i) powered by the UUV dock and ii) configured to provide the fourth sensor data to the floating base station;

wherein the computer unit comprises at least one processor, a memory, an operating system configured to perform executable instructions, and a computer program including instructions executable by the at least one processor to receive the first, second, third, and fourth sensor data, and transmit a signal comprising the first, second, third, and fourth sensor data to a remote monitoring station, via the communications unit; and
   wherein the system is configured to operate continuously unmanned for a period of time of at least 120 days.

2. The system of claim 1, wherein the floating base station further comprises at least one of a beacon light, a drone landing element, a wireless mesh router, a speaker, a flag, a GPS sensor, AIS receiver, a GPS beacon, a microphone, and a flare.

3. The system of claim 1, wherein at least one of the first sensor, the third sensor, and the fourth sensor comprises an acoustic array, a Geiger counter, an electromagnetic meter, a seismometer, a salinity meter, a humistor, a rain gauge, an anemometer, a flow sensor, a GPS sensor, AIS receiver, a compass, a hydrometer, a pressure sensor, a barometer, a gyroscope, a tide gauge, a thermometer, a camera, a RADAR, a LiDAR, a laser scanner, a sonar, an air pollution sensor, or any combination thereof.

4. The system of claim 3, wherein the first sensor consists of an acoustic array.

5. The system of claim 4, wherein the acoustic array has a length of about 0.1 meters to about 500 meters.

6. The system of claim 3, wherein the first sensor comprises an anemometer and wherein the computer unit is capable of instructing the tethered aerial drone to land or fly depending on a measurement of the anemometer.

7. The system of claim 1, wherein the second sensor comprises a sonar, a laser scanner, or any combination thereof.

8. The system of claim 7, wherein the second sensor comprises an array of second sensors.

9. The system of claim 8, wherein a length of the array of second sensors is about 0.1 meter to about 500 meters.

10. The system of claim 1, wherein the spatial data comprises spatial data associated with a submerged portion of a water vessel.

11. The system of claim 1, wherein the tethered aerial drone is capable of operating under wind speeds of 0 knots to 40 knots.

12. The system of claim 1, wherein the tethered aerial drone is capable of landing on water or on the floating base station.

13. The system of claim 1, wherein the tether has a length of 250 meters to 1,000 meters.

14. The system of claim 1, wherein the UUV is capable of operating within a range at least 20 kilometers of the floating base station.

15. The system of claim 1, wherein the floating base station is capable of operating with an average power consumption of less than 1.5 kW.

16. A continuously unmanned multi-phenomenon marine sensor platform comprising:
   a) a plurality of continuously unmanned multi-phenomenon sensor systems each comprising:
      i) a floating base station comprising: a power harvesting element, an unmanned underwater vehicle (UUV) dock, a first sensor configured to generate a first sensor data, an anchor, a communications unit, an energy storage element, and a computer unit;
      ii) a second sensor configured to generate a second sensor data and provide the second sensor data to the floating base station, wherein the second sensor comprises a spatial sensor and wherein the second sensor data comprises a spatial data;
   iii) a tethered aerial drone comprising a third sensor configured to generate a third sensor data, the tethered aerial drone: i) connected to the floating base station by a tether, ii) powered by the floating base station via the tether, and iii) configured to provide the third sensor data to the floating base station; and
   iv) a UUV comprising a fourth sensor configured to generate a fourth sensor data, the UUV: i) powered by the UUV dock and ii) configured to provide the fourth sensor data to the floating base station; and
b) a remote monitoring station;
wherein the computer unit of each continuously unmanned multi-phenomenon sensor system comprises at least one processor, a memory, an operating system configured to perform executable instructions, and a computer program including instructions executable by the at least one processor to receive the first, second, third, and fourth sensor data, and transmit a signal comprising the first, second, third, and fourth sensor data to the remote monitoring station, via the communications unit; and
wherein each continuously unmanned multi-phenomenon sensor system is configured to operate continuously unmanned for a period of time of at least 120 days.

17. The platform of claim 16, wherein the floating base station further comprises at least one of a beacon light, a drone landing element, a wireless mesh router, a speaker, a flag, a GPS sensor, AIS receiver, a GPS beacon, a microphone, and a flare.

18. The platform of claim 16, wherein at least one of the first sensor, the third sensor, and the fourth sensor comprises an acoustic array, a Geiger counter, an electromagnetic meter, a seismometer, a salinity meter, a humistor, a rain gauge, an anemometer, a flow sensor, a GPS sensor, AIS receiver, a compass, a hydrometer, a pressure sensor, a barometer, a gyroscope, a tide gauge, a thermometer, a camera, a RADAR, a LiDAR, a laser scanner, a sonar, an air pollution sensor, or any combination thereof.

19. The platform of claim 16, wherein the first sensor comprises an acoustic array.

20. The platform of claim 19, wherein the acoustic array has a length of about 0.1 meters to about 500 meters.

21. The platform of claim 16, wherein the first sensor comprises an anemometer, and wherein the computer unit is capable of instructing the tethered aerial drone to land or fly depending on a measurement of the anemometer.

22. The platform of claim 16, wherein the second sensor comprises a sonar, a laser scanner, or any combination thereof.

23. The platform of claim 16, wherein the second sensor comprises an array of second sensors.

24. The platform of claim 23, wherein a length of the array of second sensors is about 0.1 meters to about 500 meters.

25. The platform of claim 16, wherein the spatial data comprises spatial data associated with a submerged portion of a water vessel.

26. The platform of claim 16, wherein the tethered aerial drone is capable of operating under wind speeds of 0 knots to 40 knots.

27. The platform of claim 16, wherein the tethered aerial drone is capable of landing on water or on the floating base station.

28. The platform of claim 16, wherein the tether has a length of 250 meters to 1,000 meters.

29. The platform of claim 16, wherein the UUV is capable of operating within a range at least 20 kilometers of the floating base station.

30. The platform of claim 16, wherein the floating base station is capable of operating with an average power consumption of less than 1.5 kW.

\* \* \* \* \*